(12) United States Patent
McClure

(10) Patent No.: US 6,902,513 B1
(45) Date of Patent: Jun. 7, 2005

(54) INTERACTIVE FITNESS EQUIPMENT

(76) Inventor: Daniel R. McClure, 3310 Cranmore Chase, Marietta, GA (US) 30066

( * ) Notice: Subject to any disclaimer, the term of this patent is extended or adjusted under 35 U.S.C. 154(b) by 272 days.

(21) Appl. No.: 10/114,230

(22) Filed: Apr. 2, 2002

(51) Int. Cl.$^7$ ............................................. A63B 21/00
(52) U.S. Cl. ................. 482/8; 482/4; 482/900
(58) Field of Search ................. 482/1–9, 900–902

(56) References Cited

U.S. PATENT DOCUMENTS

| | | | |
|---|---|---|---|
| 5,213,555 A | * 5/1993 | Hood et al. | 482/57 |
| 5,489,249 A | 2/1996 | Brewer et al. | 482/1 |
| 5,577,981 A | 11/1996 | Jarvik | 482/4 |
| 5,645,509 A | 7/1997 | Brewer et al. | 482/4 |
| 5,836,770 A | 11/1998 | Powers | 434/247 |
| 5,839,990 A | 11/1998 | Virkkala | 482/8 |
| 5,888,172 A | 3/1999 | Andrus et al. | 482/7 |
| 5,890,995 A | * 4/1999 | Bobick et al. | 482/4 |
| 5,931,763 A | * 8/1999 | Alessandri | 482/4 |
| 5,976,083 A | 11/1999 | Richardson et al. | 600/300 |
| 5,984,839 A | 11/1999 | Corkum | 482/54 |
| 6,004,243 A | 12/1999 | Evert | 482/8 |
| 6,027,428 A | 2/2000 | Thomas et al. | 482/2 |
| 6,050,924 A | * 4/2000 | Shea | 482/57 |
| 6,053,844 A | 4/2000 | Clem | 482/8 |
| 6,059,692 A | 5/2000 | Hickman | 482/8 |
| 6,110,073 A | 8/2000 | Saur et al. | 482/8 |
| 6,135,928 A | 10/2000 | Butterfield | 482/69 |
| 6,135,951 A | 10/2000 | Richardson et al. | 600/300 |
| 6,244,988 B1 | 6/2001 | Dalman | 482/8 |
| 6,280,361 B1 | 8/2001 | Harvey et al. | 482/8 |
| 6,283,896 B1 | 9/2001 | Grunfield et al. | 482/54 |
| 6,298,218 B1 | 10/2001 | Lowe et al. | 455/66 |
| 6,312,363 B1 | 11/2001 | Watterson et al. | 482/54 |
| 6,443,904 B2 | 9/2002 | Nissilä | 600/483 |
| 6,458,060 B1 | 10/2002 | Watterson et al. | 482/54 |

* cited by examiner

Primary Examiner—Glenn E. Richman

(57) ABSTRACT

The present invention is generally directed to a computerized fitness equipment that is designed to simulate, emulate, or implement actual race conditions with other users. An exemplar fitness equipment includes at least one operating component and sensors to monitor performance parameters of the at least one operating component (such as speed of movement). A display is also provided, along with logic to provide a visual display of a user's performance (as measured through the first performance parameters). In one embodiment, a communication interface is provided to communicate the first performance parameters to at least one remote, similarly-configured, fitness equipment. Performance parameters from the remote fitness equipment are also received through the communication interface. The fitness equipment includes logic to compare the first performance parameters with performance parameters received from remote fitness equipment and display the results in a comparative fashion to the user.

20 Claims, 20 Drawing Sheets

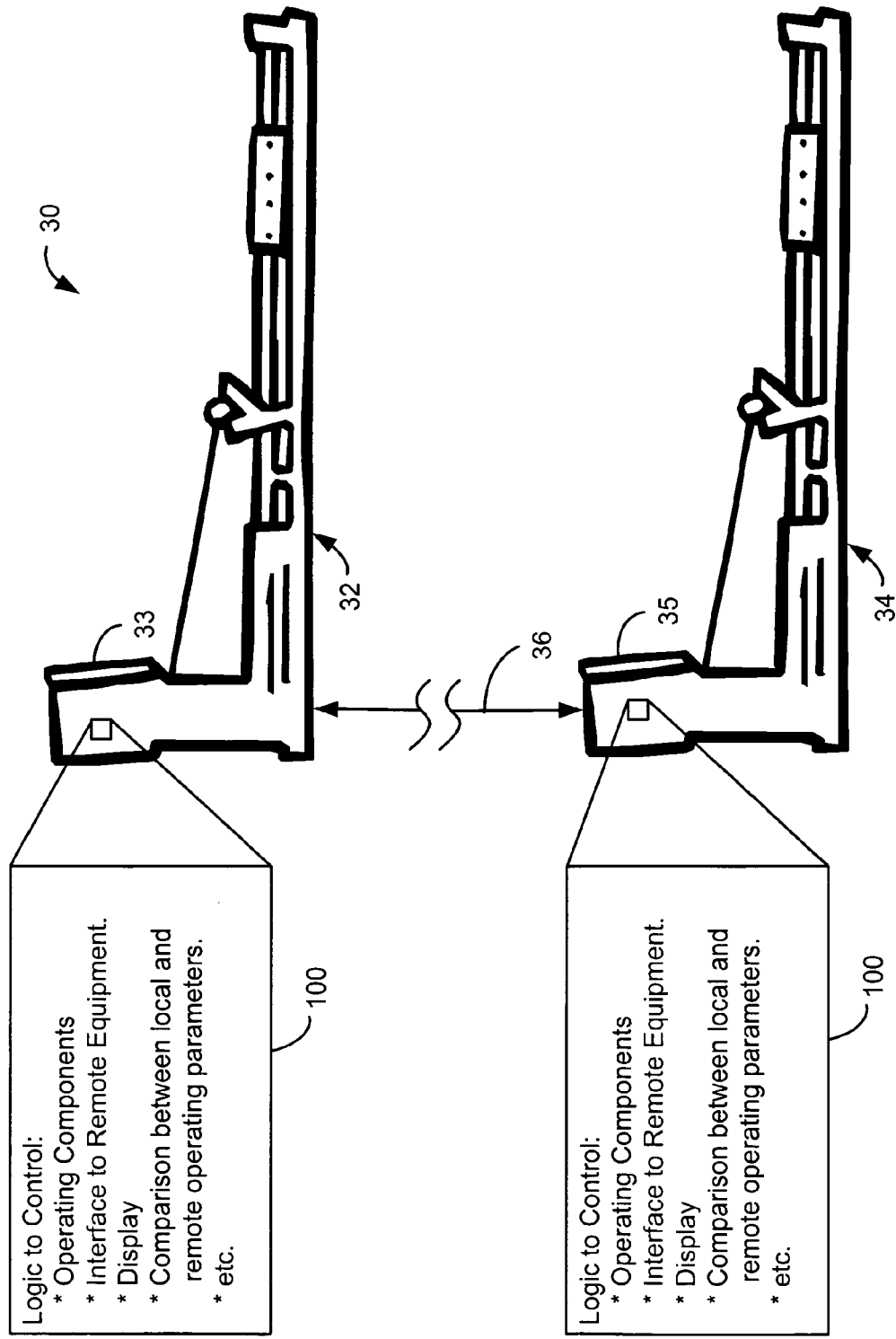

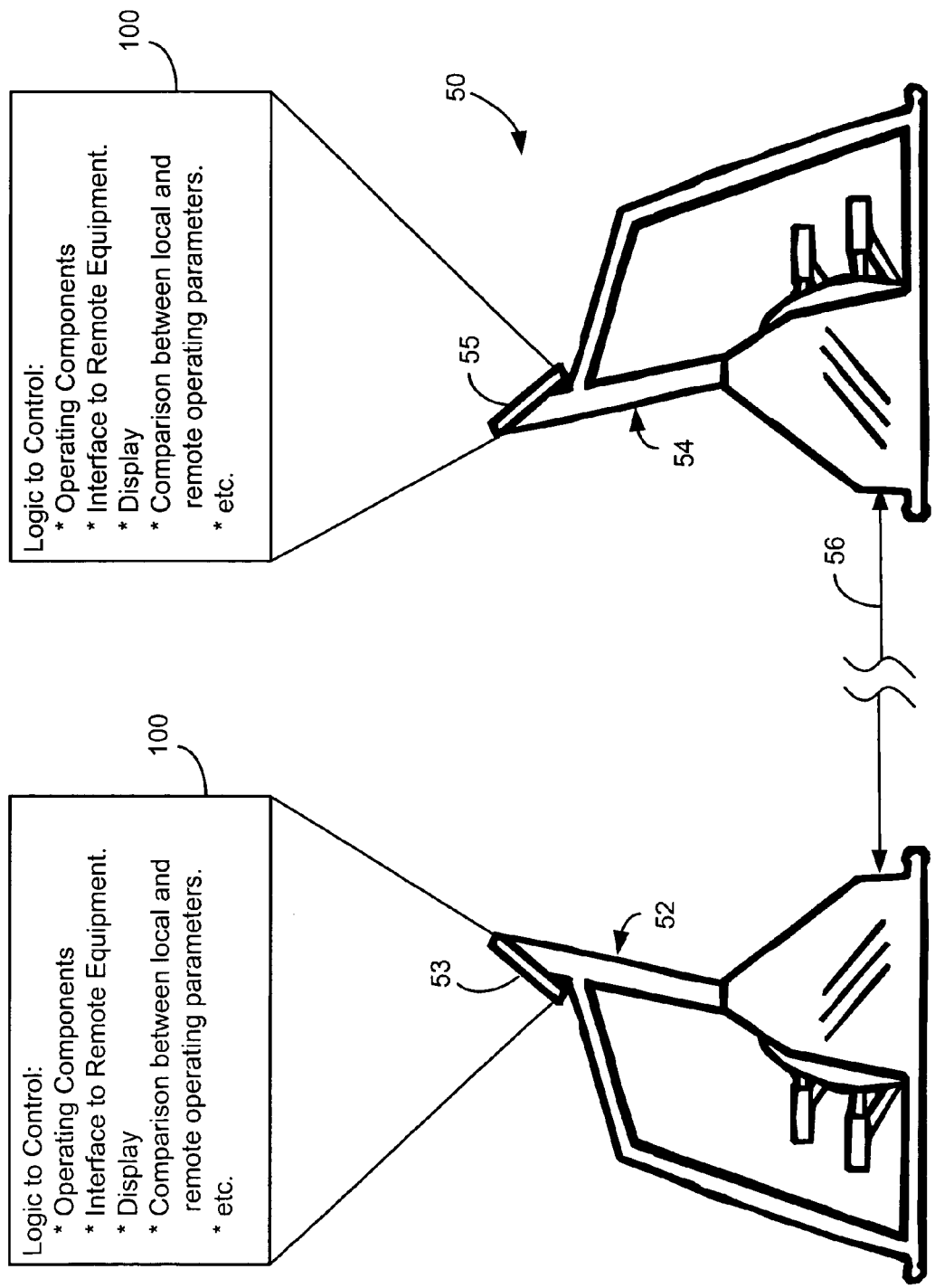

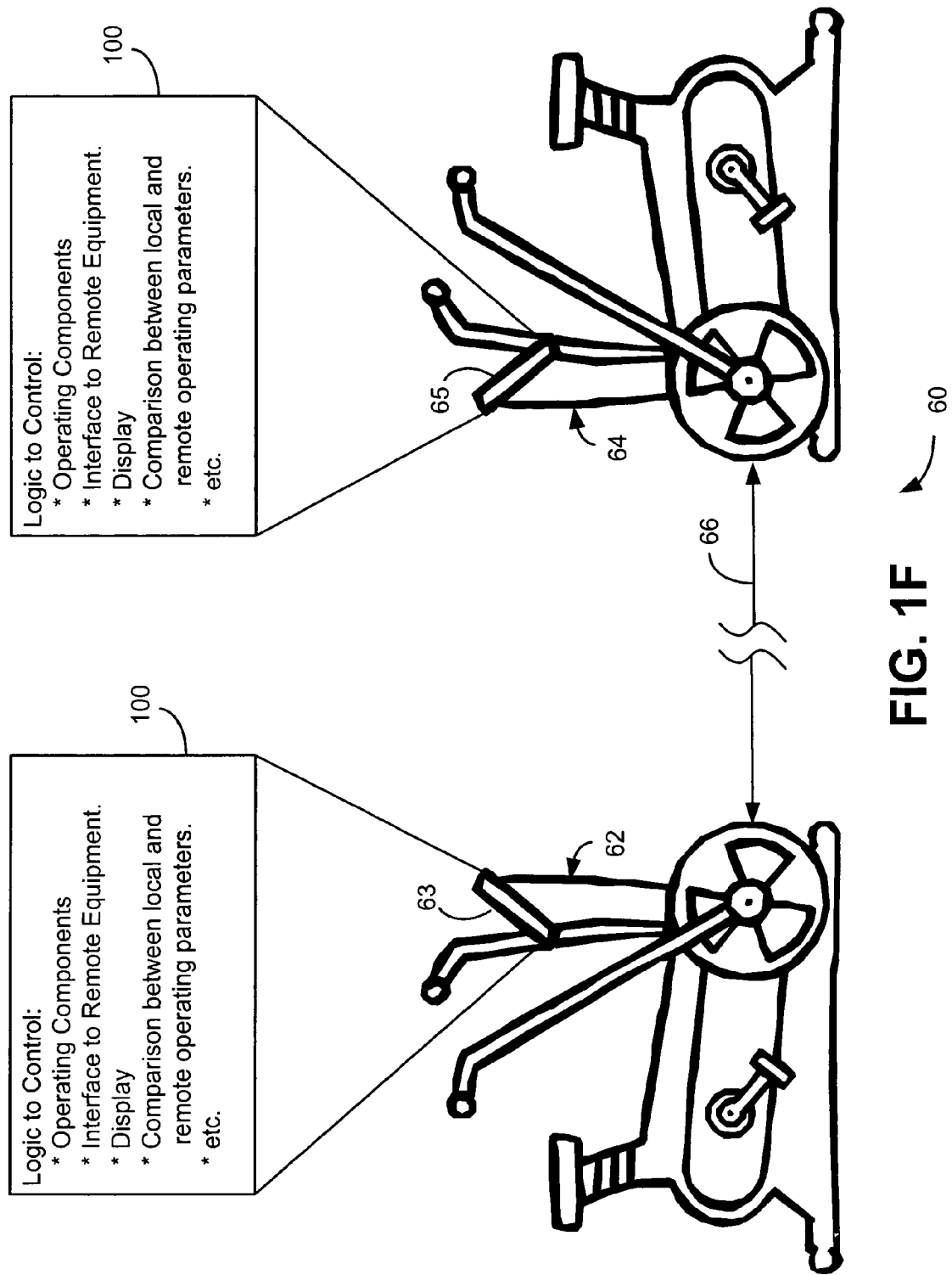

 
FIG. 3  FIG. 4
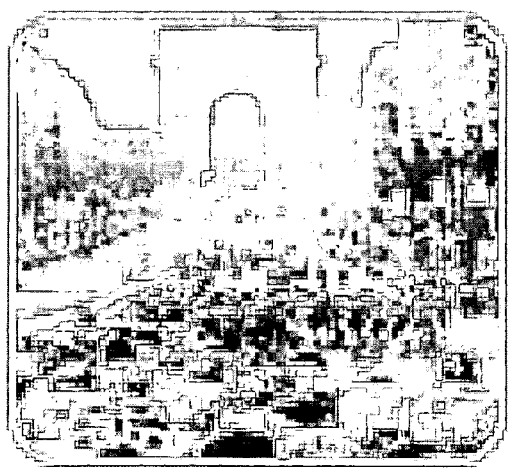 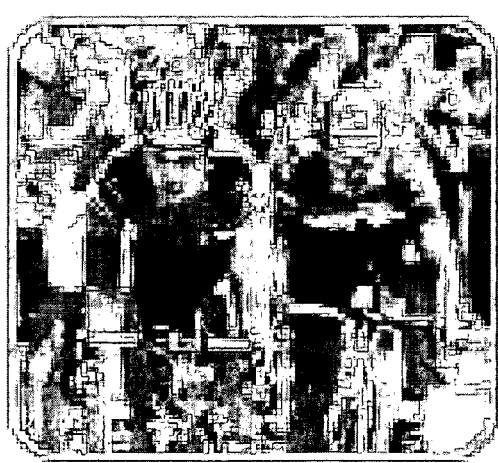
FIG. 5A  FIG. 5B

INTERACTIVE FITNESS EQUIPMENT

BACKGROUND OF THE INVENTION

1. Field of the Invention

The present invention generally relates to fitness equipment, and more particularly to interactive fitness equipment, which enhance a sense of competitive to promote more intense exercise.

2. Discussion of the Related Art

Moderate exercise, at an appropriate heart rate, is widely regarded today as an excellent way to improve one's health when performed on a regular and frequent basis. Many people prefer individual activities such as cycling, running, rowing, or skiing. These activities are often performed outdoors, usually during good weather conditions. For convenience, climate, or other reasons, many people use stationary exercise devices such as treadmills, stationary bikes or bike stands, treadmills, ski machines, rowing machines, and stair steppers.

One of the drawbacks of using stationary exercise equipment is that the scenery, typically a wall or window, viewed during the exercise period doesn't change. This type of exercising is boring. Typically, the user can counter boredom by watching TV, playing a video game, or simply letting his/her mind wander. However, these methods don't provide much real incentive for user participation and an enhanced exercise experience.

Indeed, the use of stationary exercise machines has risen in recent times due to the awareness of greater health benefits that result from regular exercise. These machines are found in gyms and health clubs as well as homes. It is not out of the ordinary to find individuals that may spend several hours per week on such machines in the quest for a better physique, increased stamina, and a higher level of overall general health.

However, many people find such long periods of time boring and repetitious. The surroundings never change, the route seldom varies, and the whole workout process just becomes one of tedium until the time limit is obtained, the desired distance is covered, or the number of calories for that session have been burned. One alternative to this is actual jogging or the riding of a conventional bike outside. However, weather and other factors may prevent individuals from exercising outdoors on a regular basis. Indeed, this is often what motivated the use of stationary exercise machines in the first place.

While watching television or listening to the radio may help pass the time while using stationary exercise machines, it does not provide for an interactive exercise session like one may get if actually jogging outdoors or riding a conventional bike. Furthermore, there is seldom any real sense of competition when one is using an exercise machine, and competition often pushes individuals to a higher level of achievement and thus a better workout.

In recent years, health clubs have organized various exercise classes and routines involving a group setting. In the proper setting, a group approach to exercise creates a synergy, whereby individual members of the class derive encouragement and motivation from other members of the group. In addition, group settings promote a healthy sense of competition among group members. Initially, such group fitness and exercise classes typically involved aerobics, traditionally performed without the use of any ancillary exercise equipment or devices. In recent years, however, the group workout approach has been extended to classes that utilize various exercise devices. Take, for example, the recent rise in popularity of "Spinning Classes," in which each participant operates his or her own stationery exercise cycle in a group setting, with a coach or instructor leading the group through a prescribed program or routine. Similarly, with recent advances in the design of treadmills, it is possible to have "Treadmill Classes" wherein an instructor not only leads and motivates the group, but the instructor is also able to control the operation of the treadmills of all of the class participants from a single control panel.

One of the disadvantages with group training, however, is that it is typically available only at health clubs and/or only at specified times and, therefore, is not as convenient as exercising in the privacy and comfort of one's own home.

Some efforts have been made in the prior art to introduce a level of "interactivity" into exercise machines. For example, video exercise control systems are known in which a video cassette recorder or similar device is coupled, via a hard-wired connection, to an exercise machine, such as a treadmill, and wherein the speed and inclination of the treadmill are controlled by the VCR in synchronization with prerecorded audio/video presentations. Other systems are known, which provide a remote exercise control system in which an exercise machine, such as a treadmill, which includes a control console that communicates via a communications module with an evaluation module located at a remote location. Signals indicative of the operating parameters of the treadmill are transmitted from the treadmill to the evaluation module, and control signals are transmitted from the remote evaluation module for controlling the operating parameters of the treadmill. Still other systems are known, wherein an exercise device is coupled, via hard-wired connection, to a video game device, such that the operating parameters of the exercise device are used as inputs to the video game controller, which then produces a motivational video display based on the inputs received. These approaches, however, do not facilitate live, interactive communications between a treadmill user at home and a trainer or coach in a remote location, which allow the trainer or coach to control the operating parameters of the use's treadmill on a real time basis.

Accordingly, there is a need for a means by which one can utilize a stationary exercise machine and be afforded an interactive session and a sense of competition to heighten motivation and enthusiasm for exercising.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to computerized fitness equipment that is designed to simulate, emulate, or implement actual race conditions with other users. An exemplar fitness equipment includes at least one operating component and sensors to monitor performance parameters of the at least one operating component (such as speed of movement). A display is also provided, along with logic to provide a visual display of a user's performance (as measured through the first performance parameters).

In one embodiment, a communication interface is provided to communicate the first performance parameters to at least one remote, similarly-configured, fitness equipment. Performance parameters from the remote fitness equipment are also received through the communication interface. The fitness equipment includes logic to compare the first performance parameters with performance parameters received from remote fitness equipment and display the results in a comparative fashion to the user.

In another embodiment, first performance parameters for a particular exercise event may be stored in a memory, and recalled for later racing events in the form of a simulated competitive racer. The fitness equipment may include logic to compare the first performance parameters with the previously-stored performance parameters and display the results in a comparative fashion to the user.

In yet another embodiment, a system is provided wherein a server is configured to coordinate simultaneous exercise events to simulate "competitions" among remote users exercising on geographically-dispersed fitness equipment.

DESCRIPTION OF THE DRAWINGS

The accompanying drawings incorporated in and forming a part of the specification illustrate several aspects of the present invention, and together with the description serve to explain the principles of the invention. In the drawings:

FIG. 1C is a diagram illustrating two rowing machines configured to exchange information across a communication link.

FIG. 1E is a diagram illustrating two stepping machines configured to exchange information across a communication link.

FIG. 1F is a diagram illustrating two exercise bicycles configured to exchange information across a communication link.

FIGS. 3 and 4 illustrate possible views of a display constructed in accordance with one embodiment of the invention.

FIGS. 5A and 5B illustrate possible views of a display constructed in accordance with one embodiment of the invention.

DETAILED DESCRIPTION OF THE PREFERRED EMBODIMENT

Figure 1A:
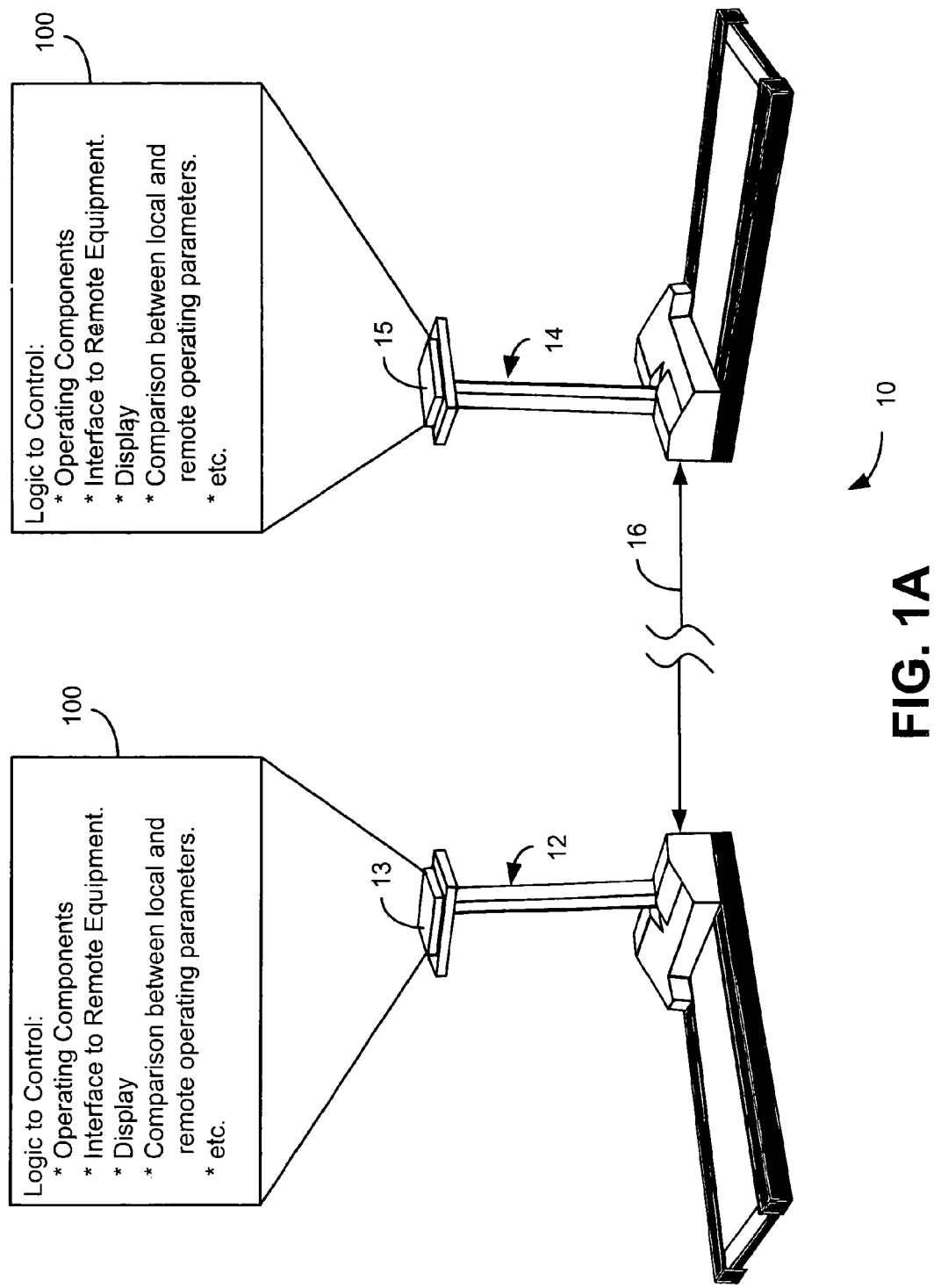
FIG. 1A is a diagram illustrating two treadmills configured to exchange information across a communication link.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

As summarized above, the present invention is directed to fitness equipment that provides an aspect of interactivity that enhances the competitive nature of the exercise, and thereby enhances the user's motivation and performance. As will be described in more detail below with particular reference to the drawings, there are various features and embodiments of the inventive fitness equipment. Before making specific reference to the drawings, however, certain inventive features will be briefly discussed. The term "fitness equipment" will often be used herein. It should be understood that this term is broadly used to denote a variety of fitness equipment and apparatus. In this regard, the term "fitness equipment" includes, but is not limited to, treadmills, exercise bicycles (both upright and recumbent), rowing machines, skiing machines, stair or stepping machines, cross-trainers, climbing machines, etc. Most of these devices are stationary equipment that are utilized to achieve cardiovascular or aerobic exercise.

The benefits of using fitness equipment over real-life training are numerous. Perhaps, first and foremost is convenience. The fitness equipment listed above (and others) is often set-up in any of a variety of rooms in, for example, a person's home.

Therefore, the person need not travel to a remote destination in order to exercise. Even if the fitness equipment is used in a gym or fitness center, which requires travel, the fitness equipment are still set up indoors, and therefore the person exercising is not subject to inclimate weather conditions. With regard to treadmills, it is well known that the running platform of most treadmills has bounce or give to it such that running on a treadmill is not as abusive or harsh on one's joints (e.g., knees) as running outdoors on pavement. With regard to running and cycling, using fitness equipment is much safer, as a person need not be exposed to traffic, as is often the case outdoors. With regard to rowing machines, skiing machines, stair or climbing machines, the convenience of fitness equipment far exceeds that of finding appropriate places or locations to perform these types of exercises outdoor.

Turning now to certain inventive features and embodiments, one embodiment of the present invention involves competitive exercise. As mentioned above, one of the drawbacks to exercising on stationary fitness equipment is the sheer boredom that often sets in since the environment does not change. One feature of the present invention overcomes this drawback by enhancing the competitive nature of the exercise. In this regard, one embodiment of the invention allows two or more fitness equipment apparatus to be communicatively coupled so that a user on one machine may "compete" against the user(s) on the communicatively-coupled fitness equipment apparatus. As will be described in more detail below, circuitry, logic, and/or software may be provided on the fitness devices to allow them to both communicate and to control the competitive interaction of the fitness equipment. Of course, normal circuitry (e.g., motor drives, tension control, etc.) will be provided as part of the fitness equipment. Since, however, such circuitry and controls are conventional and well known, they need not be described herein. In accordance with this embodiment of the present invention, the two or more coupled fitness equipment may coordinate the effective start of a "race" or other competing event. The respective users may then begin exercising at their own pace, using the controls on the respective fitness equipment to control speed in a manner that is conventionally known. The displays, however, on the various fitness equipment may provide a visual read indication show where the particular user is in relation to the user or users that are operating the coupled fitness equipment. Therefore, the user on a given apparatus may vary the speed of that apparatus in order to more effectively compete with the other users.

In one embodiment, handicaps may be factored in when individuals of differing athleticism are competing. In this regard, through the use of incline adjustments, tension control, or even speed control, the fitness equipment may be programmed to establish certain handicaps, such that the equipment being used by the more athletic users may be set with a more difficult tension level, or may require that person to operate the equipment at a faster pace than the remaining user(s). By providing each user with a visual indication of his or her respective position in a competitive "race," the invention stimulates a competitive nature within the respective users thereby making the exercise more motivating and therefore effective.

In one embodiment, the two or more fitness equipment apparatus may be directly coupled through a wire or cabling. In such an embodiment, the fitness equipment will be disposed in a close proximity to one another. An example may be two fitness equipment apparatus disposed side-by-side in a health club or fitness center. Alternatively, two or more fitness equipment apparatus may be coupled through wireless link (e.g., RF, infrared, ultra sonic, etc. transceivers). Again, it is generally contemplated that such a configuration would be for fitness equipment apparatus that are disposed in relatively close proximity to one another. In another embodiment, however, fitness equipment may be remotely located. Specifically, a person in a first geographic location may compete with a person in a second geographic location by coupling the fitness apparatus over a wide area network.

Perhaps the most common, or certainly most logical, wide area network would be the Internet. In this embodiment, the fitness equipment may be equipped with appropriate communication circuitry such that each device is assigned an IP address, and logic to establish a connection to the Internet. This logic may include dial-up networking logic, DSL communication logic, cable modem circuitry, etc.

Alternatively, in a closely-related embodiment, the fitness equipment could be equipped with circuitry and logic for interfacing with a personal computer that has an established Internet connection. In this regard, constant Internet connections are becoming more and more common and popular in residential environments through the use of DSL modems, cable modems, or even dial-up modems utilizing a dedicated phone line. With appropriate software loaded onto the personal computer, a communication channel between the personal computer and the fitness equipment could be established, either through physical cabling, or a wireless link. The fitness equipment could then communicate through the personal computer and onto the Internet, where it could exchange information for establishing and controlling competing events with remotely-located users having compatibly-configured fitness equipment.

Communication among remote devices over the Internet is now well established and well-known technology. Therefore, implementation details about features such as these need not be described herein, as the implementation of these embodiments is deemed to be well within the level of skill of someone having ordinary skill in the art.

In another embodiment, a server may be provided on the Internet for hosting a variety of racing events. Fitness equipment of various types may be sold to individual users for installation in their homes to allow the users to connect the fitness equipment to the Internet and access to the remote server that hosts various racing or other competitive events. In such an embodiment, users of all types of fitness equipment could access the remote server, indicate the type of racing event they wish to enter, such as a foot race using a treadmill, a bicycle race using an exercise bicycle, a canoeing or kayaking race using a rowing device, etc. The server may request certain input from users to ascertain their competitive level, and associate them with other users having similar competitive levels. In one embodiment, the server may simulate artificial racing contestants, in the event that there are not enough users at any given time desiring to enter a racing event.

By using cookies, storing the IP address of a given user, or using other Internet-based technology that is known, the server may keep a database of information regarding individual users, so that after a user has accessed and used the server in a first race, that information may be saved for when the user returns to that server for subsequent exercising sessions. This would prevent the user from having to re-enter competitive data over and over. In addition, as a given user progresses in speed or talent, the server could track the progression of the user as well and, when appropriate, could advance the user to differing competitive levels.

It will be appreciated that the display provided on the fitness equipment may be relatively simple in nature, or may be a high resolution LCD, flat panel, or CRT display. In this regard, providing higher resolution graphics on a given display would, in most instances, increase the enthusiasm of the various users, and therefore be a desirable option. In one embodiment, various racing circuits or courses may be stored, and users could simulate races over these stored courses. Similar technology is implemented in a variety of computer graphics applications. For example, flight simulator software is sold for training persons in aviation. Certain of these software packages have details of numerous airports and cities stored so that when a user simulates the flying of an aircraft in or around a given city, the graphics presented to the user on the computer screen are remarkably detailed and similar to actual cities. This same type of technology could be employed in storing numerous racing courses for the users to race upon interactively. In this regard, iformation defining course layout, distances, terrain, scenery, etc. may be defined. Since this technology in the computer gaming industry is already well known, it need not be described herein.

In another embodiment of the invention, virtual-reality technology may be implemented. Specifically, instead of a conventional display on the fitness equipment, the fitness equipment may be equipped with virtual-reality headgear that allows a user to slip on a headset, whereby the racing conditions may be simulated in a "virtual" environment. In such an embodiment, in a given interactive racing event, if a user is trailing another user, the user would be able to see the other user ahead of him/her in the virtual-reality headgear. Likewise, if the user were ahead of the other user (or users), the user could, by rotating his/her head backwards, could view the user(s) behind him/her. Likewise, by rotating the user's head from left to right, the user could gain a sweeping or panoramic view of the scenery surrounding the racing track or course. Again, virtual-reality technology is known by persons skilled in the art, and therefore implementation details of such need not be described herein.

In a related embodiment, augmented-reality technology may be used in place of virtual-reality technology. As is known, augmented-reality technology is similar to virtual-reality, except that graphic information is projected onto a clear or transparent viewing screen (i.e., goggles) in front of a user's face. The transparency of the headgear allows the user to also see the real environment around him. Such an embodiment would, of course, be desirable when the fitness equipment is, for example, a treadmill, as the user would need to be able to maintain his/her location on the running platform. However, for devices such as exercise bicycles, rowing devices, stair climbers, etc., a virtual-reality headgear may be a very desired feature. Indeed, used in a virtual-reality environment, the user is essentially transported into the racing or competitive environment, and the stationary surroundings of the room in which the fitness equipment is located is no longer visible or apparent to the user. Indeed, it will be appreciated that the utilization of virtual-reality offers the potential to enhance sports and fitness by creating realistic simulations and enhancing the experience of indoor exercise.

Clearly, one can visualize an immersive, virtual-reality system which increases the pleasure, or decreases the boredom of using these devices by immersing the user in a realistic alternative environment. Such systems indirectly track body movements by monitoring the moving parts on the machine. To many users of repetitive exercise machines, a virtual ride through the Swiss alps would be more enjoyable than a stationary ride through the local gym, and be worth a small increase in cost.

In yet another embodiment, fitness equipment may be provided for simulating competitive events, even though only a single user may be using the equipment (i.e., there are no remote or competitive users). One way the fitness equipment may do this is to simulate a competitor. In this regard, the user may input certain personal data pertaining to his/her level of competitiveness or athleticism (e.g., age, time it takes to run a mile, etc.), and the fitness equipment may simulate a similar competitor. In an alternative, but similar embodiment, the fitness equipment may store certain individual performances by a user and retrieve those performances for subsequent exercise sessions of the user. The retrieved performances may be used as though they are a competitor.

For example, suppose the fitness equipment is a treadmill and a user uses the treadmill for the first time on a Monday, running three miles in twenty-eight minutes. The user may run this three miles at a constant pace or may vary the pace along the way. Under either scenario, the logic within the treadmill stores the data on a continuing basis. Thereafter, suppose the user returns to run another three-mile session on Wednesday, the logic within the treadmill could retrieve the stored information from the Monday routine and provide that information comparatively in a visual display on a continuous basis as the user is exercising Wednesday in comparison to the user's performance in the Wednesday event. Preferably, this information could be displayed graphically so that the user gets the sense of competing against another competitor (albeit stored information). Indeed, the fitness equipment could store numerous individual sessions for a user such that in a subsequent session, the user could effectively compete against four or five (or more) previous performances. This would give the user the appearance of being in a race against multiple competitors, all of whom may perform slightly different (depending upon how the user performed on those individual days). Such an embodiment effectively allows a user to "compete" against his/her own skill set, and therefore against very closely-matched simulated competitors.

In yet another embodiment, where the fitness equipment has stored courses, the fitness equipment may automatically adjust incline, tension, or other settings on the fitness equipment to closely simulate the stored courses. Assume, for example, a racing course traverses hills. If the fitness equipment is an exercise bicycle, then it may automatically increase the tension as the user is progressing uphill, and decrease the tension as the user is cycling downhill. Likewise, if the fitness equipment is a treadmill, the equipment may automatically increase the incline when the equipment is simulating an uphill portion of a stored course, and decrease the incline for level or downhill portions of a stored course. A similar embodiment may be coupled to a virtual-reality embodiment (described above) to give a very realistic feel to simulated racing conditions.

The forgoing has merely summarized certain features or embodiments of a fitness equipment apparatus constructed in accordance with embodiments of the present invention. Additional features and details will be discussed below in connection with the various drawings that are referenced herein.

The inventive features of the present invention may be incorporated into conventional or known exercise devices. As is known, exercise machines typically available present the user with structure to vary the effort to be exerted by the user. For example, motorized treadmills typically have a speed control by which the user may vary the speed of the belt of the treadmill between stop and a maximum speed. The user in turn may vary the effort expended or the difficulty between the slow speed and the fast speed. Similarly, many exercise cycles have a strap frictionally positioned about a pedal driven flywheel. The user may vary the friction to in turn vary the strap friction and in turn the resistance to or the effort required of the user to move the pedals. Rowing machines, stepping machines and many other exercise machines all similarly have a frame with a movable element (or operating component). Such machines also have adjustment means interconnected by which the movement by the user in the performance of exercise is adjusted or regulated. In turn, the user may adjust the effort required of the user or the difficulty involved to perform exercise.

Individuals vary in their exercise needs and desires. Many home exercise machines have a console or control system which is in effect a computer operable by a user to vary the exercise program and in turn the effort required of the user. Further, some consoles have means to store or retain one or more exercise programs for repetitive use.

Referring now to the drawings, reference is made to FIGS. 1A–1F, which illustrate the implementation of one embodiment of the invention in a variety of different fitness equipment. Of course, the illustrations of FIGS. 1A–1F are provided merely for purposes of illustration and should not be deemed to be limiting upon the scope of the invention, as other fitness equipment may be implemented consistent with the scope and spirit of the invention. Referring first to FIG. 1A, a system 10 is shown having two treadmills 12 and 14 configured to exchange information across a communication link 16. The communication link 16 may be a direct connection (either wired or wireless) or alternatively may be a link established across a local area network or a wide area network. Each treadmill 12 and 14 is preferably configured to have a display 13 and 15, respectively, which can provide a visual display to the user of the user's own performance, as well as certain comparative performance information pertaining to the user of a remote treadmill. Furthermore, although the embodiment illustrated in FIG. 1A illustrates only two treadmills 12 and 14, it will be appreciated from the discussion herein that additional treadmills may be provided to intercommunicate across the communication link 16.

Each treadmill includes conventional operating components, such as motors, belts, flywheels, and other devices or mechanisms that are conventionally provided in treadmills. In this regard, some treadmills may include motors to control a degree of incline to the platform, motors to control the velocity at which the endless conveyor belt travels, etc.

In accordance with one embodiment of the invention, logic 100 is provided to control various operational aspects of the treadmills 12 and 14. In this regard, logic refers to hardware, software, or combination of the two. Broadly, this logic implements the control of the operating components of the treadmills, and interface to remote equipment, a visual and/or audible display, comparison between local and remote operating parameters, etc. With regard to the interface to remote equipment, and as will be described in further detail herein, this interface may comprise a DSL modem, a cable modem, PSTN modem, Ethernet or other network communication device, a cellular interface, a wireless interface, a serial interface, a parallel interface, or any of a variety of other communication interfaces that are known and understood by persons skilled in the art. In one embodiment, an interface may be provided to communicate with a local computer, which in turn is configured to communicate either directly or indirectly (through another computer) to the remote treadmill.

Logic 100 also includes logic for controlling the display 13. In one embodiment, the display may comprise a cathode-ray-tube (CRT). In other embodiments, the display may be an LCD display, a gas plasma display, an LED panel display, a display of a virtual-reality headset, a display of an augmented-reality headset, etc.

The logic 100 also includes logic for comparing operating parameters of the local treadmill 12 with operating parameters with a remote treadmill 14. Assuming the two treadmills 12 and 14 are of a similar or compatible model, the speeds and/or inclines may be compared so that the display 13 may provide a visual comparison of the two treadmills. By way of a more specific example, assuming there is no deviation between the two treadmills 12 and 14 in the incline of the platform, the logic 100 of treadmill 12 may receive via the interface to remote equipment a measure of the instantaneous speed of the remote treadmill 14. This speed may be compared against the current speed of the local treadmill 12 to provide a visual comparison on the display 13. Over time, the differential in speed may be used to track an effective separation distance between a person on treadmill 12 and a person on treadmill 14. This separation distance may then be incorporated into a visual display 13.

In a more complex embodiment and as will be discussed in further detail herein, each treadmill may include data that effectively defines a course over which two competing athletes will travel. This course may include areas of incline as well as areas where the treadmill platform may be substantially flat. The treadmills 12 and 14 may be configured to automatically adjust the incline at the appropriate times consistent with the course data that may be stored in the individual treadmills. For example, suppose treadmills 12 and 14 each have a stored course which is substantially flat for the first one half mile, then has a three-degree elevation for the next half mile. If the person using treadmill 12 sets the speed on that treadmill to operate the conveyor at a faster speed then the person using treadmill 14, treadmill 12 will elevate its platform at an earlier time than treadmill 14, because the person using treadmill 12 will have effectively reached the incline portion of the course more quickly than the person on treadmill 14.

Of course, consistent with the scope and spirit of the present invention, a wide variety of courses or interactive system features may be implemented.

Figure 1B:
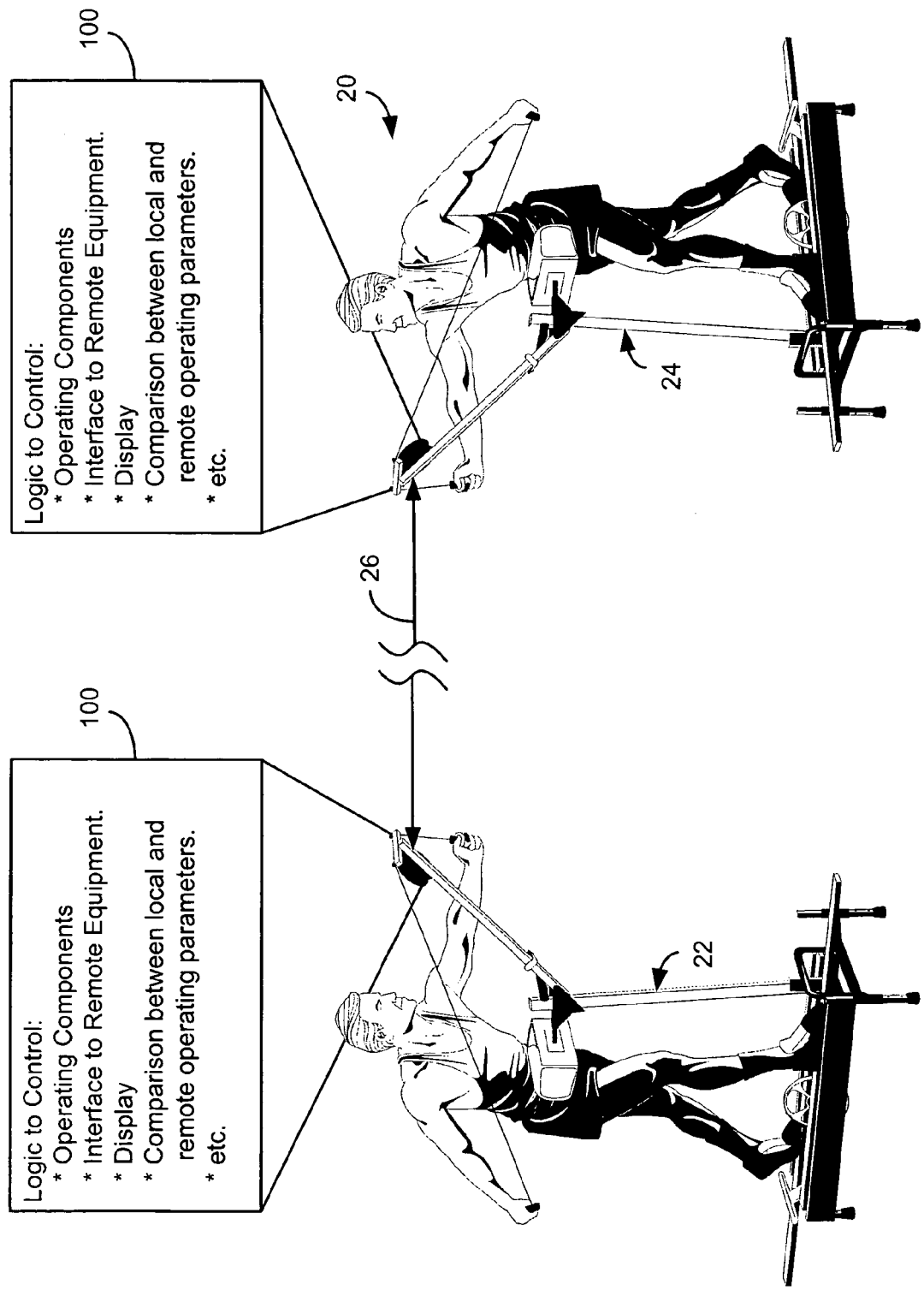
FIG. 1B is a diagram illustrating two ski machines configured to exchange information across a communication link.

Reference is now made to FIG. 1B, which illustrates a system 20 wherein a plurality of ski machines 22 and 24 are configured to exchange operating parameters over a communication link 26. Like the treadmill embodiment of FIG. 1A, each ski machine 22 and 24 of the embodiment of FIG. 1B includes logic 100 to control various operation aspects of the ski machines 22 and 24. Although not specifically illustrated in FIG. 1B, the ski machines 22 and 24 may be configured with displays (visual, audible, or both) to provide an enhanced sense of competition and feedback to the users. Similarly, FIG. 1C illustrates a system 30 having a plurality of rowing machines 32 and 34 configured to exchange operational parameters over a communication link 36. The rowing machines 32 and 34 may include displays 33 and 35, respectively. In addition, and like the previous embodiments, the rowing machines may include logic 100 for controlling various operational components and parameters of the rowing machines.

Figure 1D:
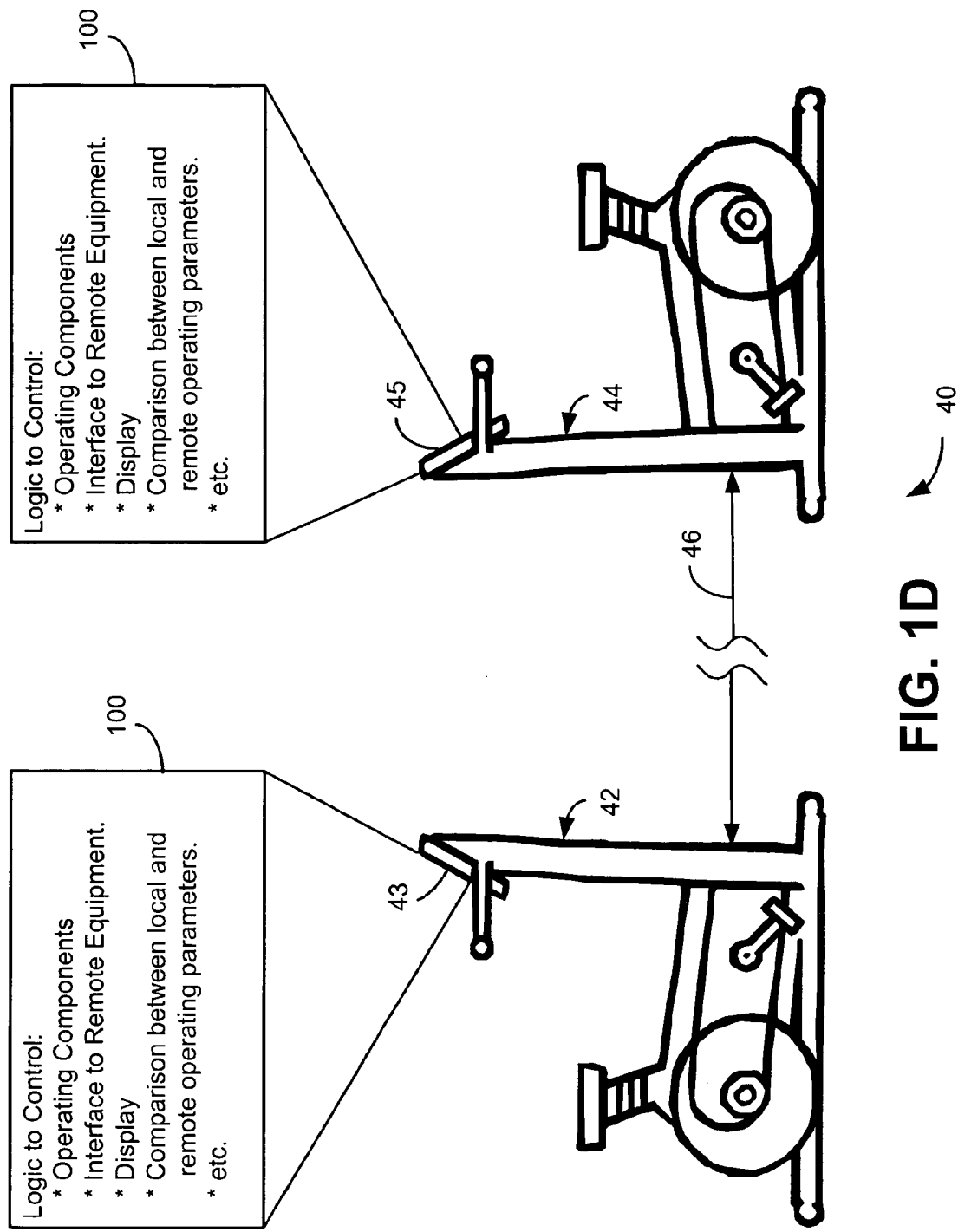
FIG. 1D is a diagram illustrating two exercise bicycles configured to exchange information across a communication link.

FIG. 1D illustrates a system 40 having a plurality of exercise bikes 42 and 44 that are configured to exchange operational and performance information over a communication link 46. The exercise bikes 42 and 44 may include displays 43 and 45, respectively, to provide visual, audible, or other information to the users. Like the previously described embodiments, the exercise bikes 42 and 44 may also include logic 100 for controlling various operational aspects of the exercise bikes.

FIG. 1E illustrates a system 50 having a plurality of stepping machines 52 and 54 configured to exchange performance and/or other information over a communication link 56. The stepping machines may include displays 53 and 55, respectively, to provide visual, audible, or other informational feedback to the users. Like the previously described embodiments, the stepping machines 52 and 54 may include logic 100 for controlling various operational aspects and components of the stepping machines.

Finally, FIG. 1F illustrates a system 60 having two exercise bikes 62 and 64 of a different type than that illustrated in connection with FIG. 1D. In this regard, the exercise bikes 62 and 64 include moveable handles, which provide additional operating components and information that may be exchanged over a communication link 66. The exercise bikes 62 and 64 also include displays 63 and 65, respectively. Like the previously described embodiments, the exercise bikes 62 and 64 include logic 100 for monitoring and controlling various operational aspects of the exercise bikes 62 and 64.

Again, the fitness equipment illustrated in FIGS. 1A–1F are not intended to be limiting upon the various embodiments of the invention, but rather are intended to be illustrative only and additional types of fitness equipment may be provided in accordance with the scope and spirit of the invention.

Figure 2:
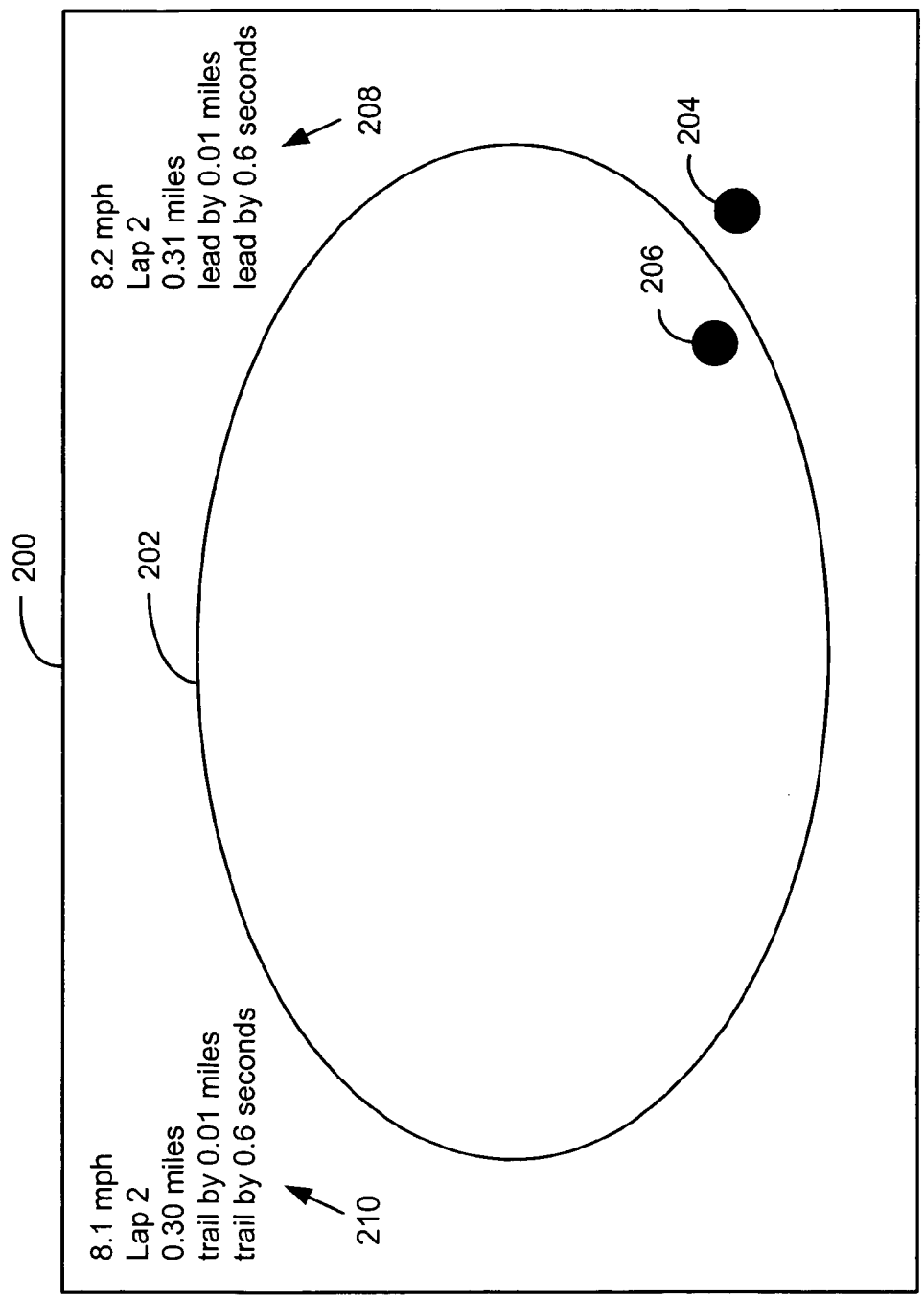
FIG. 2 is a diagram illustrating certain features of a display, in accordance with one embodiment of the invention.

It should be appreciated from the discussion herein that various types and configurations of displays may be provided for the user. In one embodiment, a visual display is provided to provide visual feedback and information to a user of particular fitness equipment. In one embodiment, the graphical information presented on a visual display may be relatively simplistic in nature. Reference is now made to FIG. 2, which illustrates one such embodiment of a display 200. In this embodiment, a display may include a graphic image of a track 202 such as an elliptical running track that is 0.25 miles in circumference. Relatively simplistic circles or dots 204 and 206 may be provided to illustrate the respective competitors. Additional textual information 208 and 210 may be provided to give more detailed data on the individual competitors and their comparative performance information. By way of example, information 208 may relate to the performance of the person viewing the display, while the information 210 (or additional such information provided for additional users) may include an instantaneous readout of the speed that the competitor is travelling, the lap number (in the case of a circuitous track such as that illustrated in FIG. 2), the distance that the user has traveled since beginning the exercise or competition (i.e., 0.31 miles in FIG. 2), the distance separating the two competitors (or alternatively, the current user with the closest-trailing competitor), the separation time between the two runners (i.e., the amount of time it would take the trailing runner to catch up, if the leading runner stopped). Of course, there are a wide variety of differing display formats that may be presented, as well as a wide variety of information that may be provided to the user.

One significant point is that providing such a display having competitive or comparative information results in a more interactive environment, thereby increasing the level or sense of competition, and therefore motivation for the user.

Indeed, many graphical systems are known, particularly in the gaming industry, whereby enhanced graphics techniques and displays are provided. This same type of technology may be incorporated into a system constructed in accordance with an embodiment of the invention to provide a more realistic sense of competition. For example, consider an embodiment in which users are competing in a virtual bicycle race, riding on stationary exercise bicycles. The graphical display may be a headset of a virtual-reality display, which effectively immerses a user in a particular (virtual) environment. Stored course data may be provided of any of a variety of courses (real or contrived) that could be selected for the users to compete over. Again, technology such as this is well known in the computerized gaming industry, as well as flight simulator and other industries and therefore need not be described herein. Each fitness equipment may track the current user's progress on a given course based upon continual monitoring of the speed at which the user is cycling. This information may be exchanged over the communication links to one or more remote devices, which may compare and correlate this information for instantaneous comparison and display to the user or users of that remote equipment. Using known technology and techniques, the visual display presented to a user may vary depending upon the position that the user turns his or head (when using a virtual-reality headset). For example, FIG. 3 illustrates a view that a user may see when looking rearwardly over his or her right shoulder. The cyclist illustrated in this figure represents a currently-competing cyclist that is trailing the current user. Likewise, FIG. 4 illustrates a view which may be seen if a user is peering over his or her left shoulder. In this figure, a competing cyclist is illustrated as being even further behind the current user.

Of course, the concepts of the invention are readily extendable to a large number of concurrently-competing users. In this regard, reference is made to FIGS. 5A and 5B, which illustrates a cycling event having a large number of competitors. FIG. 5A illustrates a view a user may see when looking forward, in a scenario where a user trails a large number of cyclists. Likewise, the view of FIG. 5 may illustrate a view that the user would see when peering rearwardly at cyclists which may be trailing the user. Using known computing techniques, the data for all "competitors" may be tracked for instantaneous display.

Similar displays may be provided on a CRT or other type of non-virtual-reality display, whereby different views may be manually-selectable by the user. Again, such technology is known in the gaming industry, and need not be described herein. Further still, additional sensory features or components may be included in a system constructed in accordance with one embodiment. For example, microphone and speaker may be included whereby competitors could talk to one another. Taking the example of a two-person competitive race, microphones and speakers could be used such that voice and other audible information may be freely exchanged between the two competitors. In one embodiment, such information may be exchanged at a constant volume simply to allow the two competitors to freely and conveniently communicate with one another. In another embodiment, the volume of the audible information exchange may be attenuated based upon an effective situation separation that exists between the two or more competitive users. It will be appreciated, in fact, that a wide variety of various embodiments may be implemented consistent with the broader concepts and teachings of the invention. It will be further appreciated that in some embodiments a virtual-reality display may be highly desirable, while in other embodiments, the use of virtual-reality may be less pragmatic. For example, in a treadmill embodiment, a virtual-reality headset may be a potential health liability, since a user preferably needs to maintain a vision of his or her surrounding so as to maintain proper position on the treadmill belt. In such an embodiment, an augmented-reality system may be utilized. Again, the present invention is not deemed to be limited by any particular type or configuration of display beyond that which is specifically defined in the appended claims hereto.

Figure 6:
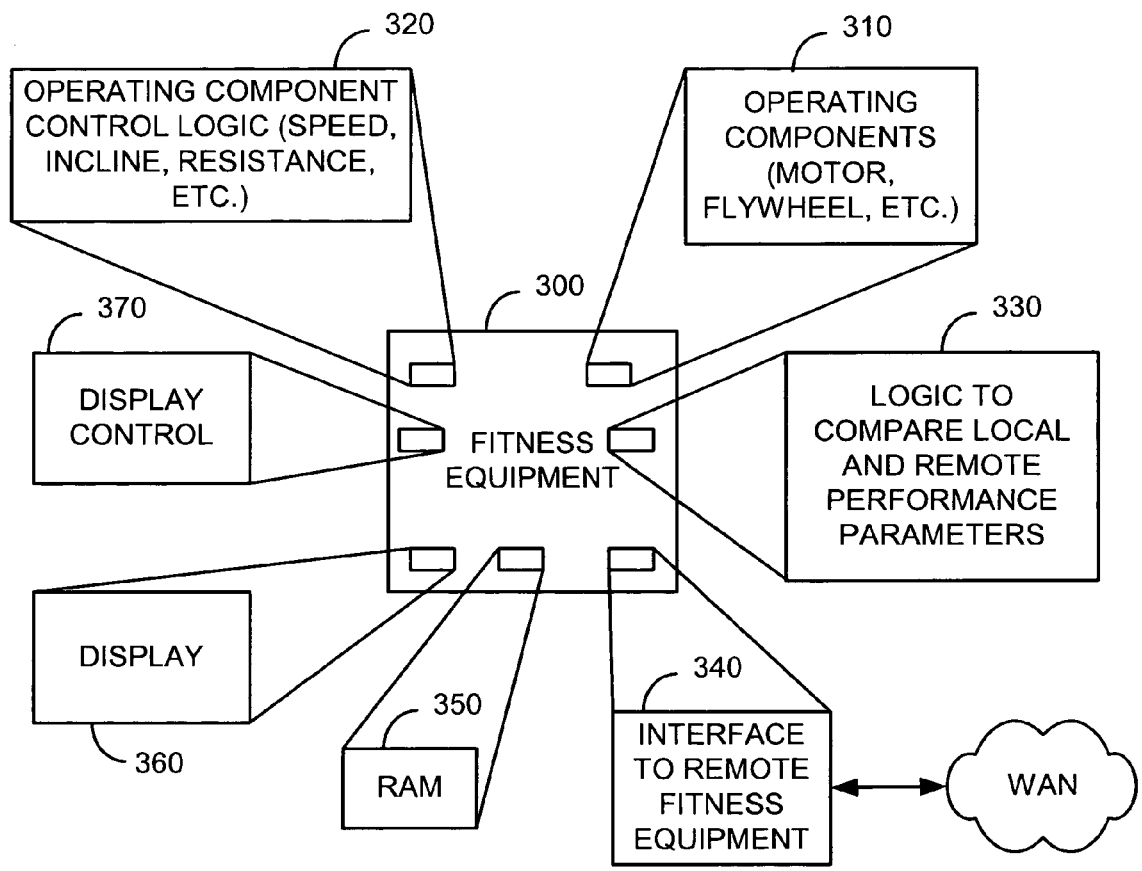
FIG. 6 is a block diagram illustrating certain basic functional logic components that may be implemented in one embodiment of the present invention.

Having described certain features of an embodiment of the present invention, reference is now made to FIG. 6, which is a block diagram illustrating certain basic functional logic components that may be implemented in one embodiment of the present invention. In this regard, fitness equipment 300 is denoted as a simple block, which should be understood to comprise a treadmill, an exercise bicycle, a stepping machine, a rowing machine, a ski machine, or other fitness equipment constructed in accordance with the teachings herein. The fitness equipment 300 includes operating components 310. As used herein, the term "operating components" denotes those conventional components that are utilized in fitness equipment for carrying out the functionality or purpose of the fitness equipment. Such components may include motors, flywheels, drags, brakes, belts, pulleys, magnetic arrangements, etc. For example, some exercise bicycles use some sort of flywheel and implement tension control either through direct physical resistance devices such as belts and chains, while others vary the resistance through the use of magnetic arrangements. Again, and for purposes of this disclosure, the term "operating component" should be given its broadest possible construction to cover these and other components that are conventionally provided in fitness equipment to carry out the operation and function (i.e., the intended exercise) of the equipment.

In accordance with one embodiment of the invention, fitness equipment 300 includes operating component control logic 320, which is provided and configured to monitor and/or control operating or performance parameters such as speed, incline, resistance, tension, etc. In addition, logic 330 is provided to compare such performance parameters of the local fitness equipment 300 with corresponding performance parameters communicated to the fitness equipment 300 from one or more remote fitness equipment devices. In this regard, the performance parameters may comprise velocity, inclination, resistance, tension, acceleration, distance traveled, as well as a variety of other parameters that may be utilized in order to provide an effective comparison between the operation of the local fitness equipment 300 with the operation or performance of the remote fitness equipment.

In order to receive such performance parameters from remote devices, the fitness equipment 300 may also include a communication interface 340, which allows communication with remote fitness equipment. As previously mentioned, this interface may take on a variety of physical forms including a modem (e.g., DSL modem, cable modem, PSTN modem), a cellular link, an Ethernet or other network card or communication protocol, a serial port, a parallel port, a USB port, an infrared or other wireless port, etc. In this regard, the communication interface 340 includes the hardware and/or software for carrying out the communication function.

Memory or RAM 350 is also provided for storing program data, as well as transient data. Transient data may include instantaneous performance parameters of a current user, as well as performance parameters received from remote fitness equipment. The fitness equipment 300 also includes a display 360, which may comprise a visible display, and/or an audible output device. Finally, display control logic 370 is provided in order to control the operation and output of the display 360.

Figure 7:
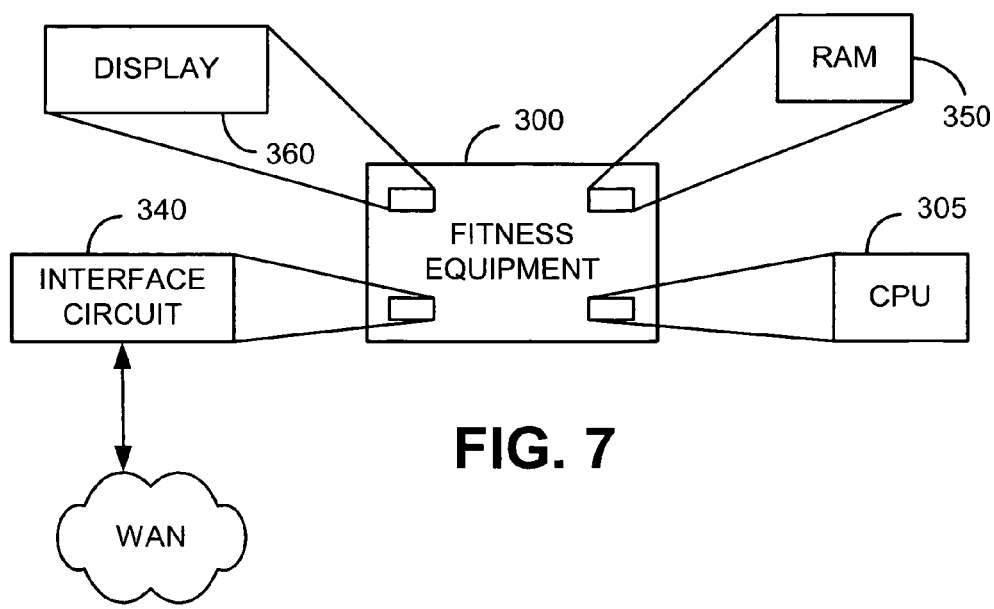
FIG. 7 is a block diagram illustrating certain physical components, which may comprise an embodiment of the invention.

Reference is now made to FIG. 7, which is a block diagram illustrating certain physical components, which may comprise an embodiment of the invention. In this regard, FIG. 6 illustrated certain functional components, whereas FIG. 7 illustrates certain physical components. One embodiment of the fitness equipment 300 may be implemented using a CPU 305 to execute instruction to implement many of the functional components illustrated in FIG. 6. Of course, in such an embodiment memory such as RAM 350 may be used to store program code that is executed by the CPU 305 for carrying out the various functions.

As previously discussed, in one embodiment of the invention, fitness equipment may be configured to communicate directly (i.e., without intermediate computing devices) with remote fitness equipment. In another embodiment, however, fitness equipment 300 may communicate with remote fitness equipment via a local computer. Such an embodiment may reduce the cost of the components provided within the fitness equipment, and instead move these components and functionality to a computer, such as a personal computer. Such an embodiment is illustrated in FIG. 8.

In this embodiment, a computer 400 may be provided in connection with fitness equipment 300. A computer 400 may include software and/or hardware that provides a WAN interface 420, that allows communications from the computer 400 to remote devices over a wide area network. In addition, computer 400 may include operational logic 405, which is logic used for providing certain functionality of the present invention. For example, if fitness equipment 300 communicates certain performance parameters to the computer 400, and the computer 400 receives certain performance parameters communicated over the WAN 460 from remote fitness equipment, the operational logic 405 may function to provide comparative analyses of the various performance parameters so that comparative information may be displayed on a computer display. In this regard, the information may be displayed on the display of the computer 400, or, alternatively, may be communicated to the fitness equipment 300 and displayed on a display of the fitness equipment.

Figure 8:
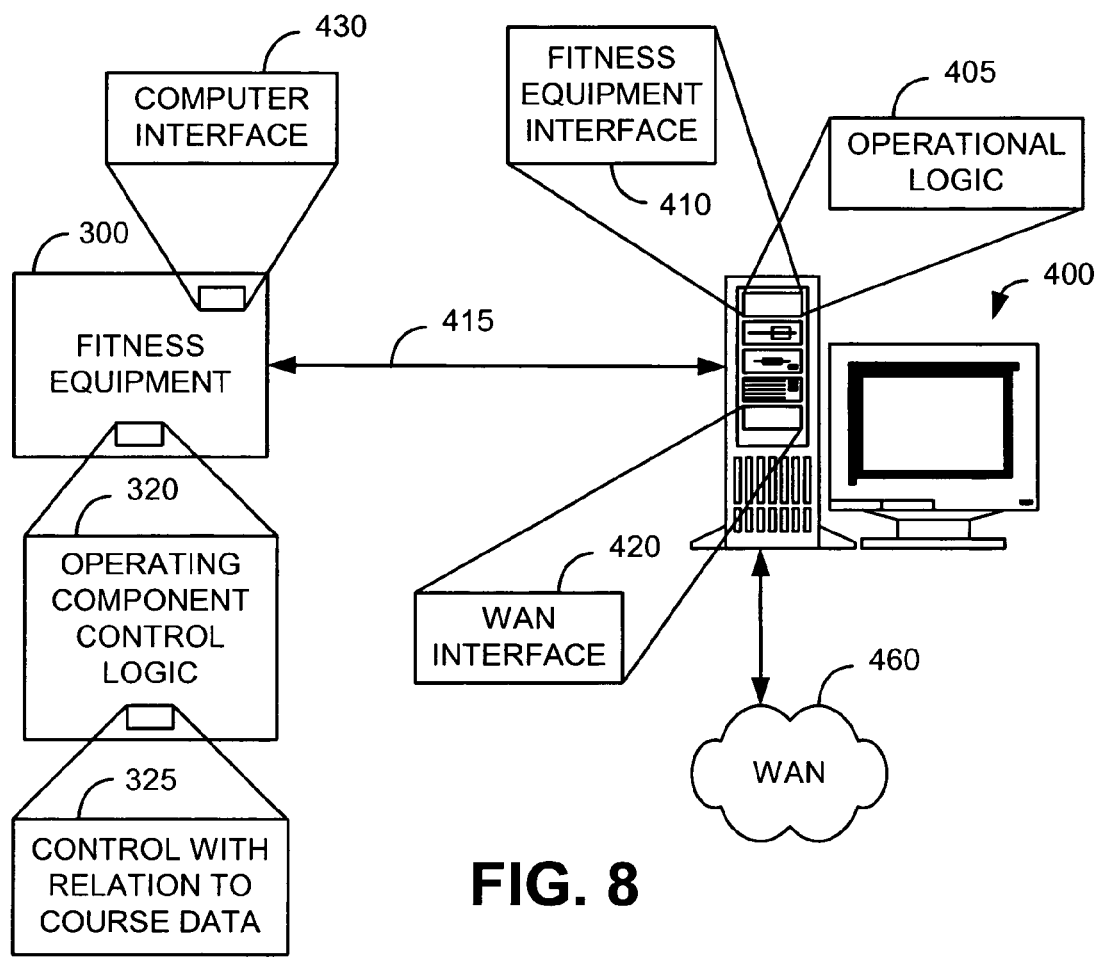
FIG. 8 is a block diagram of an alternative embodiment of the present invention.

In the embodiment of FIG. 8, the computer 400 may also include logic for implementing a fitness equipment interface 410. This logic, like other logic components discussed herein, may be implemented in the form of hardware, software, or a combination of the two, which allows communications between the computer 400 and fitness equipment 300. This communication may take place over a communication link 415, which may be a direct physical connection, or a wireless communication link.

Likewise, in this embodiment, the fitness equipment 300 may include a computer interface 430, which is a companion to the fitness equipment interface 410 that allows communication between the two devices. The fitness equipment 300 may also include operating component control logic 320, which may include logic for controlling the various operational components (e.g., motors, resistance elements, etc.) of the fitness equipment 300. In one embodiment, this operating component control logic 320 may include logic 325 for controlling various operational components in relation to course data which may be stored in a memory device (not shown in FIG. 8) within the fitness equipment 300.

Figure 9:
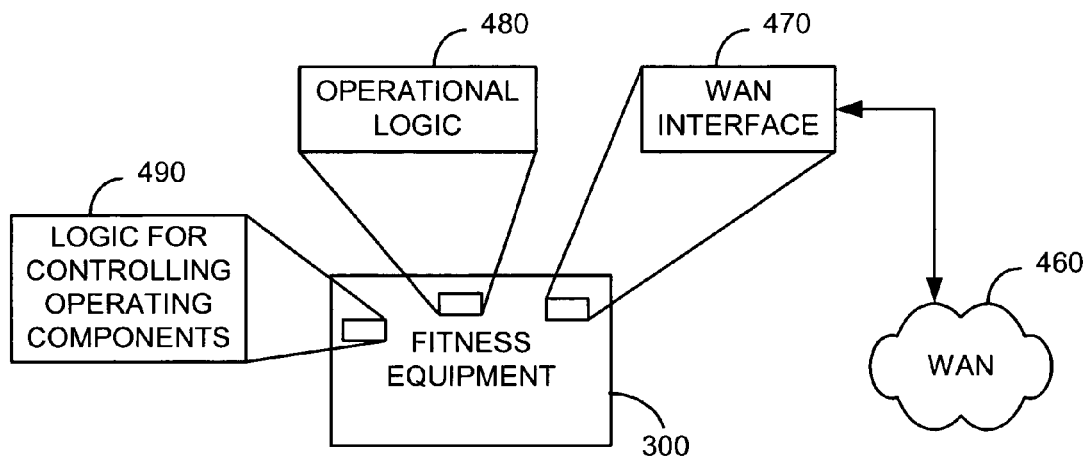
FIG. 9 is a block diagram illustrating certain components of an embodiment that is configured to communicated directly over a WAN.

It should be appreciated that the various components illustrated in FIG. 8 may be configured to work with other functional components, such as those illustrated in FIG. 6 that are described herein. However, the diagram of FIG. 8 has been presented to specifically illustrate certain components that facilitate the coupling of the computer 400 with the fitness equipment 300 for the embodiment of FIG. 8. Likewise, a similarly-illustrated embodiment is shown in FIG. 9, which illustrates an embodiment of the invention, whereby fitness equipment 300 is configured to directly communicate over a WAN 460. In such an embodiment, the fitness equipment 300 includes a WAN interface 470 and operational logic 480 (both of which were implemented on the computer 400 in the embodiment of FIG. 8), as well as logic 490 for controlling the operating components of fitness equipment 300. Again, in a system constructed in accordance with this embodiment, additional functional components such as those illustrated in connection with other embodiments herein, may be implemented as a part of the fitness equipment 300.

Figure 10:
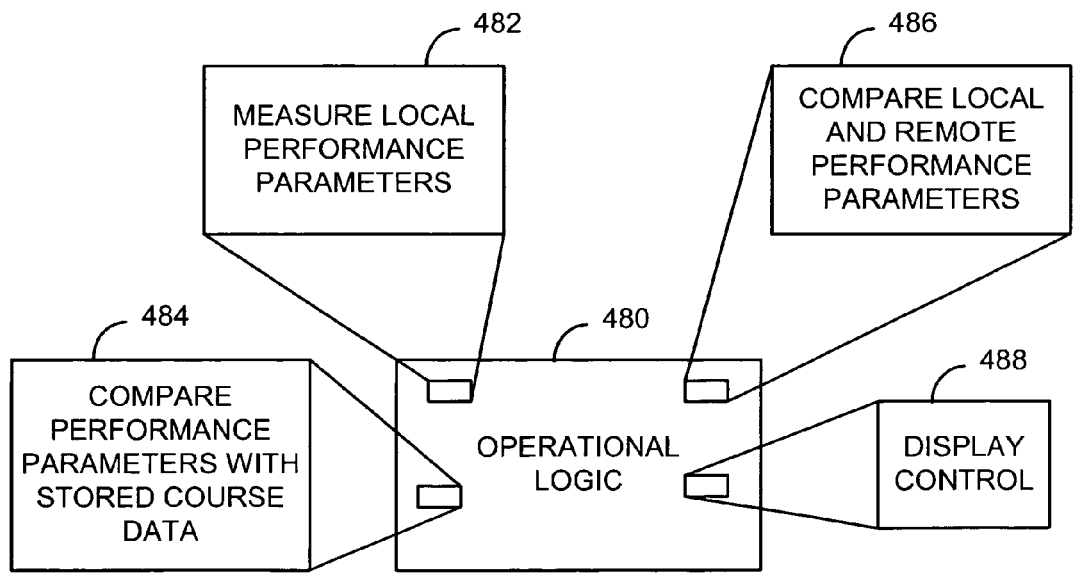
FIG. 10 is a block diagram illustrating certain subcomponents of operational logic of one embodiment of the invention.

Reference is now made to FIG. 10, which is a block diagram illustrating certain subcomponents of operational logic 480, in accordance with one embodiment of the invention. As previously discussed, one embodiment of the present invention may provide a memory having data that is stored that effectively defines a course over which a competitive race or event is to take place. The operational logic 480 may include comparison logic 482 that monitors or measures instantaneous performance parameters of the local fitness equipment 300. The operational logic 480 may also include comparison logic 484 that is configured to perform a comparison between performance parameters that are monitored or measured by logic 482 with stored data or parameters that define the course data. This comparison logic 484, for example, may be useful in embodiments in which the display is providing a measure of the total distance traversed. More importantly, this logic 484 may be utilized in an embodiment where a more detailed graphical display (such as a virtual-reality display) provides a visual indication of a user's progress along a particular course.

The operational logic 480 may also include logic 486 for comparing performance parameters measured by logic 484 with performance parameters received through an interface (such as WAN interface 470) of remote fitness equipment. This logic 486 allows the fitness equipment 300 to display comparative information between the user of fitness equipment 300 and a user of remote, but competing, fitness equipment that is communication with fitness equipment 300. Further still, the operational logic 480 may include logic 488 for controlling the display. Of course, the implementation of this logic will vary depending upon type and configuration of display.

Figure 11:
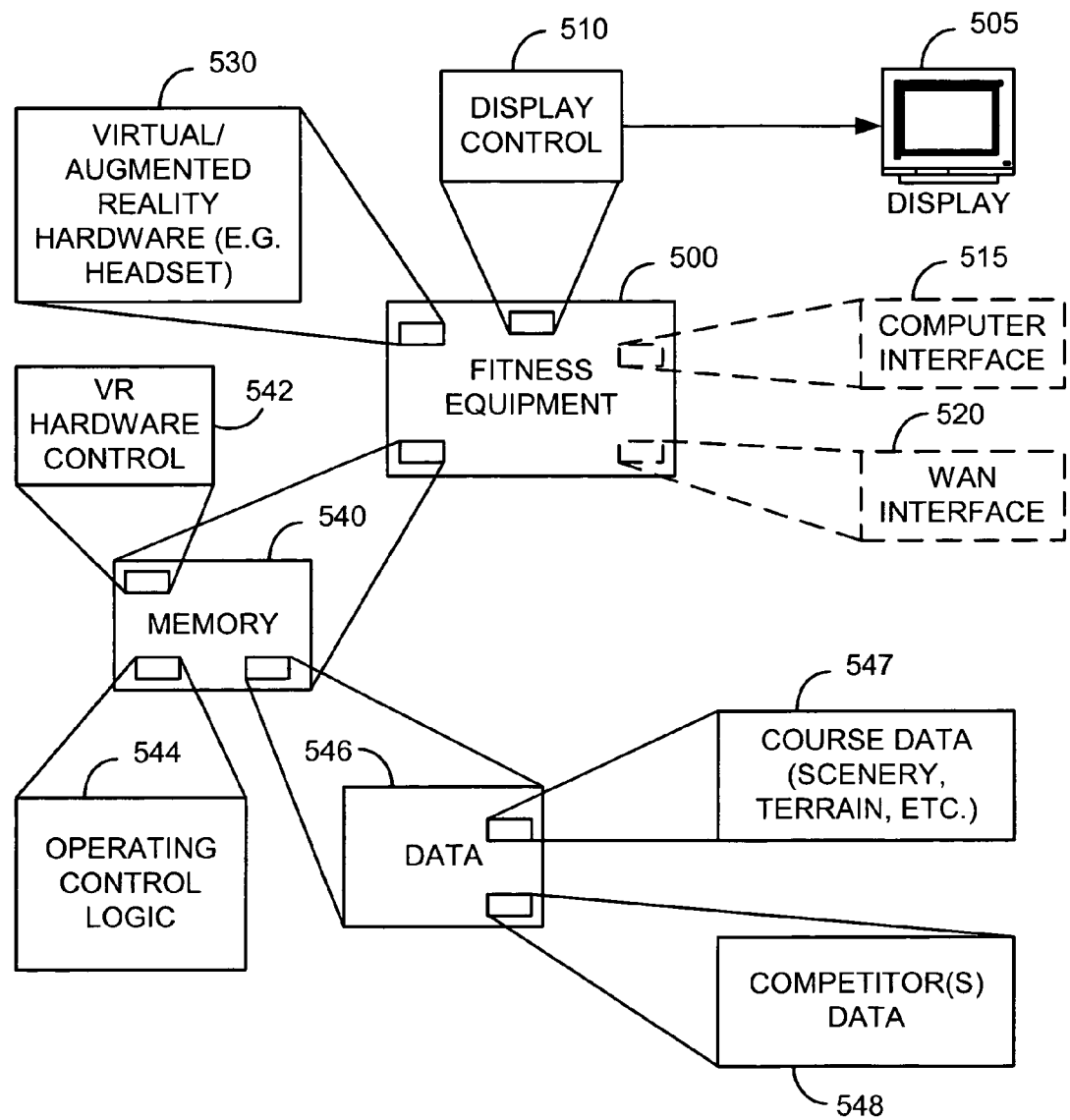
FIG. 11 is a block diagram illustrating an alternative embodiment of the present invention.

Reference is now made to FIG. 11, which is a block diagram illustrating an alternative embodiment of the present invention. It should be appreciated, however, that this embodiment may include features and functions similar to other embodiments disclosed herein, in addition to those features illustrated in FIG. 11. In this embodiment, fitness equipment 500 is illustrated. A display 505 may be provided in connection with the fitness equipment. In accordance with embodiments disclosed herein, the display 505 may be integrated as part of the fitness equipment 500, or alternatively may be implemented through the display of a coupled computer (such as a personal computer). Of course, display control logic 510 is provided to control the graphics and/or other images to be displayed on the display 505. Consistent with the other embodiments disclosed herein, the fitness equipment 500 may be coupled through a computer to communicate with remote fitness equipment. In such an embodiment, the fitness equipment 500 may include a computer interface 515, as discussed in connection with FIG. 8.

In addition, or alternatively, the fitness equipment 500 may include a WAN interface 520, similar to that discussed in connection with FIG. 9. These interfaces provide and support communications with remote fitness equipment either directly or through intermediate computers, using communication technology that is understood by persons skilled in the art. In the embodiment of FIG. 11, the fitness equipment 500 may also include a virtual-reality or augmented-reality display 530. The underlying technology for implementing such a display is well known, and will be understood by persons skilled in the art without further discussion herein.

The fitness equipment 500 also includes memory 540 that may include operating control logic 544, logic 542 for controlling the virtual-reality or augmented-reality hardware, as well as operational data 546. The functionality of the operating-control logic 544 has been described above in connection with other embodiments, and a similar functionality and implementation may be provided in connection with the embodiment of FIG. 1. With regard to the operational data 546, among other things, this data may include course data 547, as well as competitor data 548. The course data may include that data which is appropriate or necessary for defining one or more courses that a user may select among for competing in a given race. This data may define the scenery, terrain, and other environmental conditions or surroundings associated with particular courses. Again, the technology for implementing such features is known in the computer gaming industry, among others, and will therefore be appreciated by persons skilled in the art. With regard to the competitor's data 548, this data may include performance parameters received from remote fitness equipment that can be interpreted and utilized by the fitness equipment 500.

As previously mentioned, additional functional components may be included in the embodiment of FIG. 11 to permit or facilitate proper operation of the fitness equipment 500, in accordance with embodiments of the present invention. For example, although not specifically illustrated in FIG. 11, the operating-control logic 544 may include logic for comparing the current user's performance parameters in relation to stored course data 547. Likewise, the operating control logic 544 may include logic for providing a comparative analysis and/or display of the current user's performance with the relative performance of remote users using remote fitness equipment that is in communication with the fitness equipment 500. Again, additional functional components may be included within the fitness equipment 500 consistent with the scope and spirit of the present invention.

Figure 12:
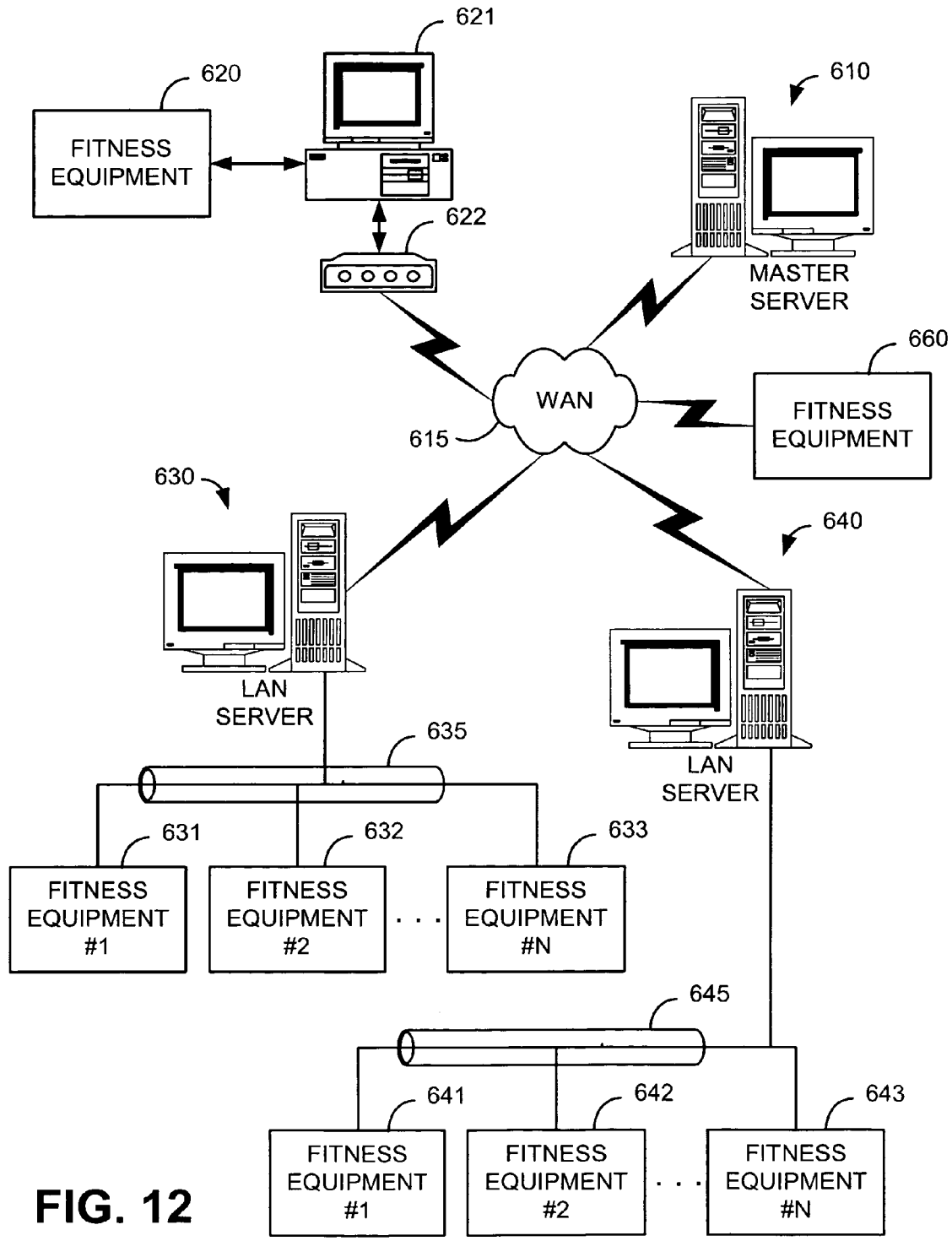
FIGS. 12 and 13 are block diagrams illustrating certain components of a distributed fitness system constructed in accordance with an embodiment of the invention.
Figure 13:
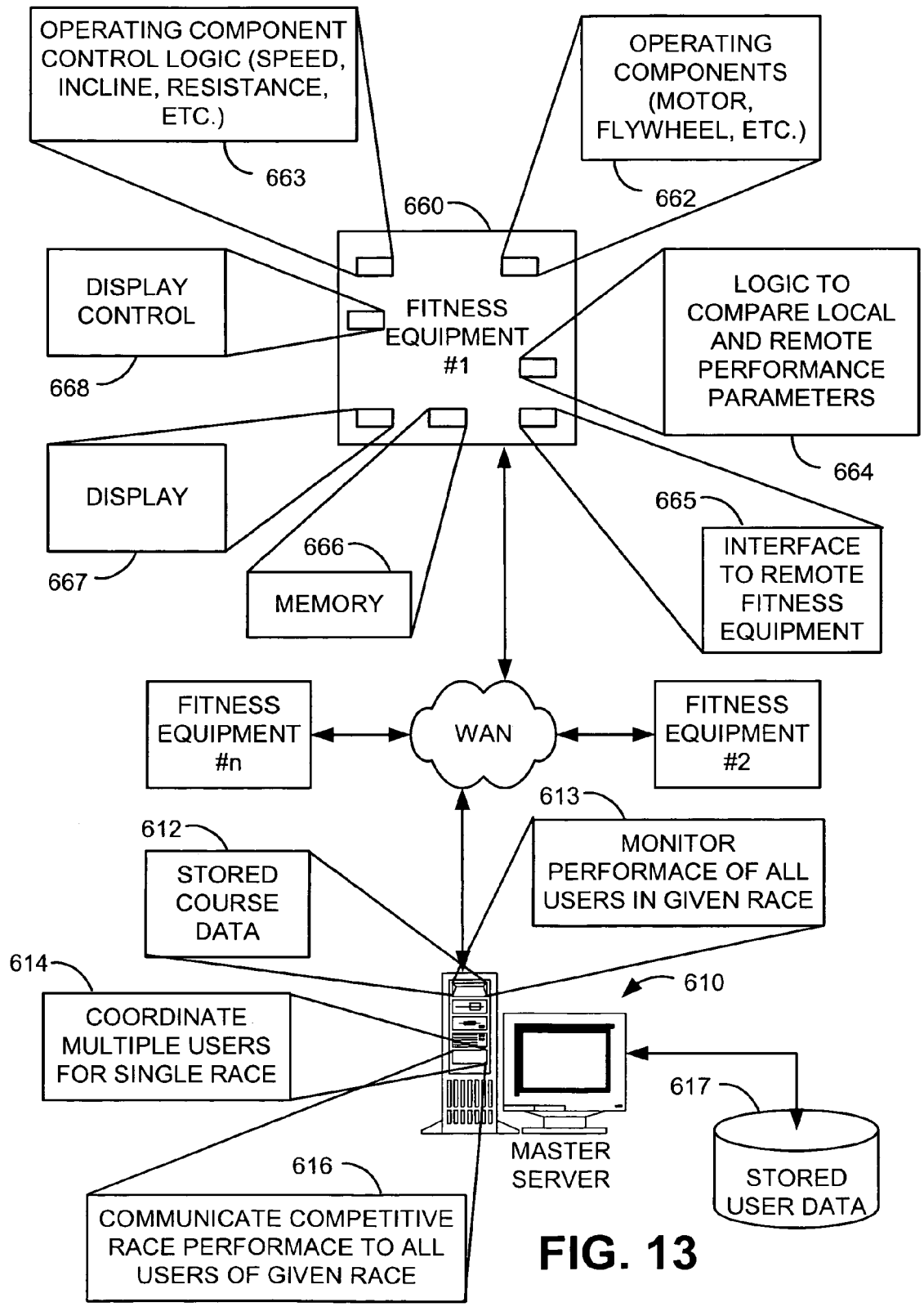

Reference is now made to FIGS. 12 and 13, which collectively illustrate certain features of a system constructed in accordance with another embodiment of the present invention. In this embodiment, a server 610 is provided in communication with a WAN 615. The master server 610 communicates with a plurality of fitness equipment 620 over the WAN 615. In the embodiment of FIGS. 12 and 13, the master server 610 is configured to coordinate racing events between a plurality of individual users in various locations, and communicate with the individual fitness equipment of the various locations accordingly. FIG. 12 illustrates certain physical components comprising such a distributed system. In addition to the master server 610, additional LAN servers 630 and 640 may be provided to individually consolidate communications from a plurality of fitness equipment associated with each. For example, LAN server 630 may communicate with fitness equipment 631, 632, and 633 over a LAN 635. Similar communications may exist between LAN server 640 and various fitness equipment 641, 642, and 643 across a LAN 645. Such a configuration may be present, for example, in a fitness center providing a plurality of fitness equipment for patrons of that fitness center. A given location of a fitness center may couple the various fitness equipment provided therein together through a local area network, consolidate the individual data from the various fitness equipment, and communicate through a single LAN server 630 to the master server 610, and across the WAN 615. Other fitness equipment 620 and 660 may be coupled through the WAN 615 either directly (i.e., fitness equipment 660) or indirectly through a computer 621 and modem 622, as has been described previously herein. By communicating with a vast number of fitness equipment around the globe, the master server 610 can, on a continuing basis, consolidate racing events among a plurality of users.

Again referring to the computer gaming industry, Web sites are known that consolidate games such as checkers, chess, and other games that allow users from all parts of the globe to compete. The server 610 may be configured to operate in a similar fashion in the context of fitness events. By way of example, consider a user having an exercise bicycle that wishes to compete in a racing event with another user. Through logic or circuitry provided in connection with the fitness equipment, the user may communicate with the master server to identify that a cycling event is desired. The master server may then respond with a number of options or choices for the user. For example, the master computer may simply provide a number of courses (defined by course data) that the user could access for individualized use (i.e., not a racing event). Alternatively, the master computer may allow a user to couple or join up with other users for period racing events. In so joining the users, the master server 610 may be configured to allow the users to select a course for the racing event. Users may be further screened based upon skill level classifications, or athletic classes (i.e., moderately competitive, amateur, etc.).

It should be appreciated that the various configurations that may be provided by the master server 610 are virtually limitless and the present invention is not deemed to be limited by any particular implementation.

In keeping with the description of this embodiment, reference is now made to FIG. 13 which is a block diagram illustrating certain components that may be used to implement the embodiment of FIG. 12. In this regard, the fitness equipment 660 may include operating components 662, operating component control logic 663, logic to compare local and remote performance parameters 664, a communications interface 665, memory 666, one or more displays 667, and display control logic 668. The general implementation and functionality of these components have been described previously in connection with other embodiments, and therefore need not be described again.

With regard to the master server 610, the master server 610 may include stored course data 612, logic 613 for overseeing or monitoring the performance parameters of all the users in a given race or competition, logic 614 for coordinating multiple users for a single race, as well as logic 616 for communicating competitive race performance data to all users of a given race. The basic functionality of these blocks should be self-evident from the label identifiers and will be appreciated by persons skilled in the art.

The master server 610 may also include an associated database or datastore 617 that may be used to store user-dependent information. Using such a database 617, once a user has entered certain personal data (e.g., age, competitive or performance-defining factors), this information may be stored and retrieved in subsequent sessions, so that a user does not need to re-enter it. Likewise, the master server 610 may automatically log and store certain competitive or performance-defining factors as users perform in racing or competitive events, so that it may use such information when a user signs on (or logs in) for future events. Such information may be used, for example, to assign certain users to certain performance-level events, to handicap certain users based upon their past performance, or for a variety of other reasons.

The present invention is not deemed to be limited by any particular implementation of one or more of these functional units, and therefore a description of each need not be provided herein.

Figure 14:
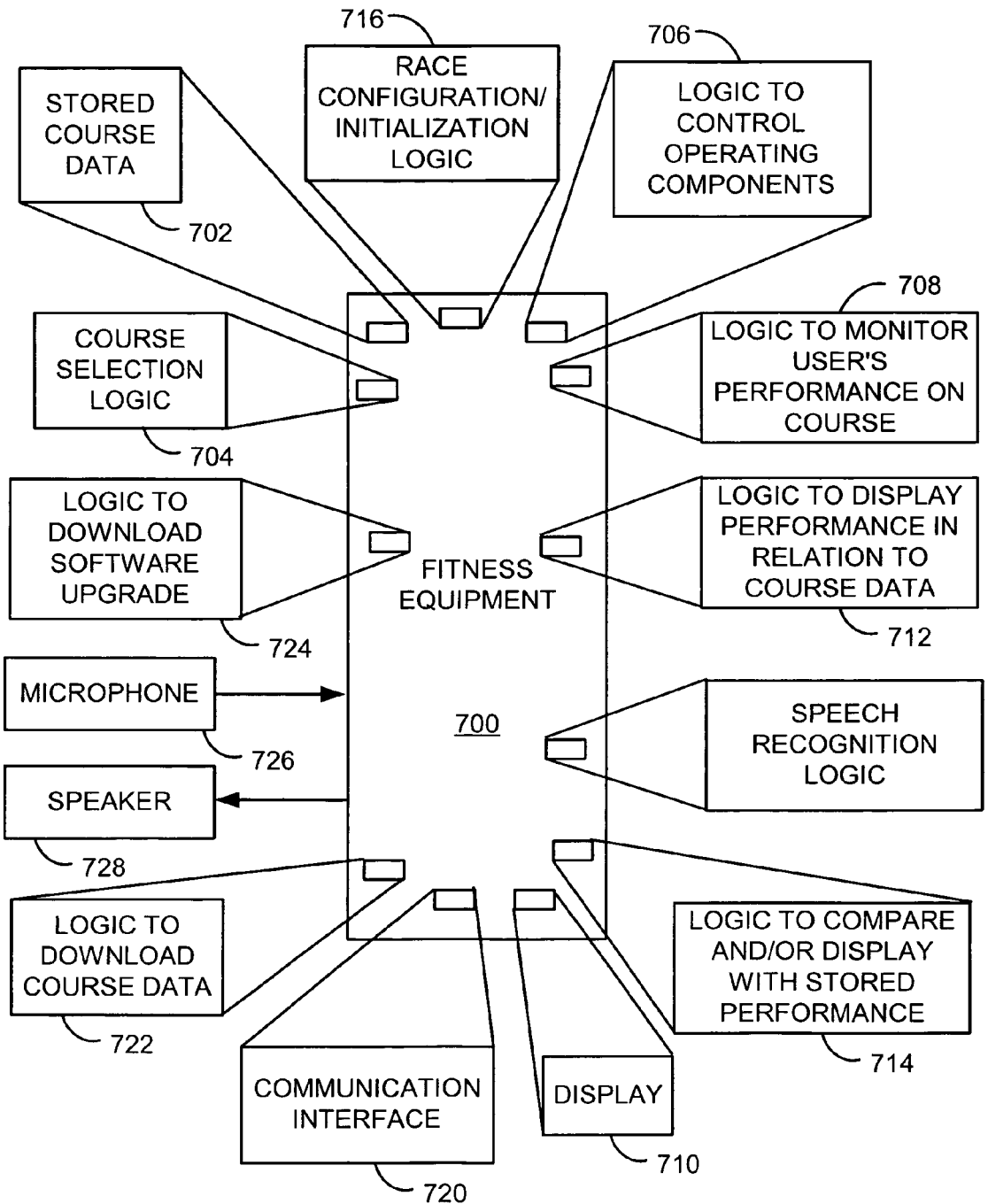
FIG. 14 is a block diagram illustrating certain components of an alternative embodiment of the invention, configured for solo use.

Reference is now made to FIG. 14, which is a block diagram of fitness equipment 700 constructed in accordance with yet another embodiment of the present invention. In the embodiment of FIG. 14, the fitness equipment 700 is configured for solo use, and may not be configured for communication with remote fitness equipment in a competitive configuration. Instead, competitive information is provided in the form of stored performance parameters. In one embodiment, a user may, for example, exercise for a predetermined period of time or predetermined distance on the fitness equipment 700 and have the performance parameters for that particular fitness event stored in a memory. Thereafter, such as on a later date, the user may elect to "compete" against his or her prior stored performance parameters in an effective racing event. The fitness equipment 700 may then compare instantaneous performance parameters with stored performance parameters, and display comparative information in much the same way as the fitness equipment previously described compared instantaneous performance parameters with performance parameters received from remote fitness equipment. Subject to this distinction, the embodiment of FIG. 14 may include the various features and functional components described in previous embodiments herein (even though not specifically illustrated in connection with FIG. 14).

In connection with the diagram of FIG. 14, the fitness equipment 700 may include stored course data 702, which may store data on a variety of courses that a user may select among. In this regard, course selection logic 704 may be provided to assist the user in selecting a course. As in previous embodiments, the fitness equipment 700 may include logic 706 for controlling the various operational components of the fitness equipment 700. The fitness equipment 700 may also include logic 708 for monitoring the user's performance parameters in comparison to the course data of a particular course. As has been previously described, if the course data includes scenery, terrain, and other information, the fitness equipment 700 may be configured to automatically adjust tension, incline, etc., in accordance with the terrain encountered on the course. Likewise, a display 710 may be provided and controlled to display appropriate course scenery, consistent with the rate at which the user is traversing the course, based upon monitored performance parameters. In this regard, logic 712 may be provided to display a user's performance in relation to course data.

Comparison logic 714 may also be provided to compare and/or display a user's instantaneous performance parameters with stored performance parameters of prior racing events. Race configuration logic 716 may also be provided that allows a user to initialize a racing event by selecting one or more stored racing performances in which to compete against. Thus, for example, if a user selects a particular course and runs, rows, cycles, or rides that course day after day, each day's fitness routine may be stored for recall in a subsequent fitness activity. As more and more data gets stored, a user may select from one or more of all of these stored parameters to compete against. Therefore, a user could effectively compete against five or ten other "racers."

In order to provide a more robust fitness equipment 700, a communication interface 720 may be provided that allows the fitness equipment to be interfaced to a computer, or alternatively, a wide area network. Information such as course data or software updates may be communicated through this communication interface to enhance the features and functionality of the fitness equipment 700. For example, a remote server may be provided that includes a continually expanding selection of courses from which a user may select. The fitness equipment 700 may, via the communication interface 720, access such a remote server to download course data for an ever-growing number of courses. Likewise, the communication interface 720 may couple fitness equipment 700 to a computer. Course data may be purchased through software or accessed via the Internet via a computer and thereafter communicated to the fitness equipment 700 through the communication interface 720. In this regard, logic 722 may be provided for controlling the download of course data and add new courses to the course selection for the fitness equipment 700. Likewise, logic 724 may be provided for controlling the downloading of software upgrades. With this logic 724, equipment purchases by a user may be effectively upgraded through the addition of enhanced features or functions through newer versions of software. In this regard, the communication interface 720 may be utilized to communicate with, for example, a remote Web site from which software upgrades are obtained.

In addition, a microphone 726 and speaker 728 may be incorporated into the fitness equipment (the embodiment of FIG. 14 or any of the other embodiments as well). As discussed further herein, the speaker 728 may be controlled/used to provide an audible output to the user. The microphone 726 may be used for a variety of reasons. In some embodiments, voice-over-data communications may be utilized to allow geographically-remote users to communicate. In this way, two competing users could talk to one another while competing. In one implementation, any such voice communications may be provided at a constant volume. In another implementation, such voice communications may be attenuated based upon simulated environmental conditions, including the simulated distance separating the two competitors.

In other embodiments, a microphone 726 may be utilized to allow a user to give spoken commands to the fitness equipment. In such embodiments, the fitness equipment may include speech recognition or speech processing logic that is configured to recognize certain spoken commands, and adjust or configure the fitness in response thereto.

It will be appreciated that the embodiment of FIG. 14 may allow a user to compete against his or her own skill sets from day to day, and effectively provide an interactive and real-time racing environment.

Figure 15:
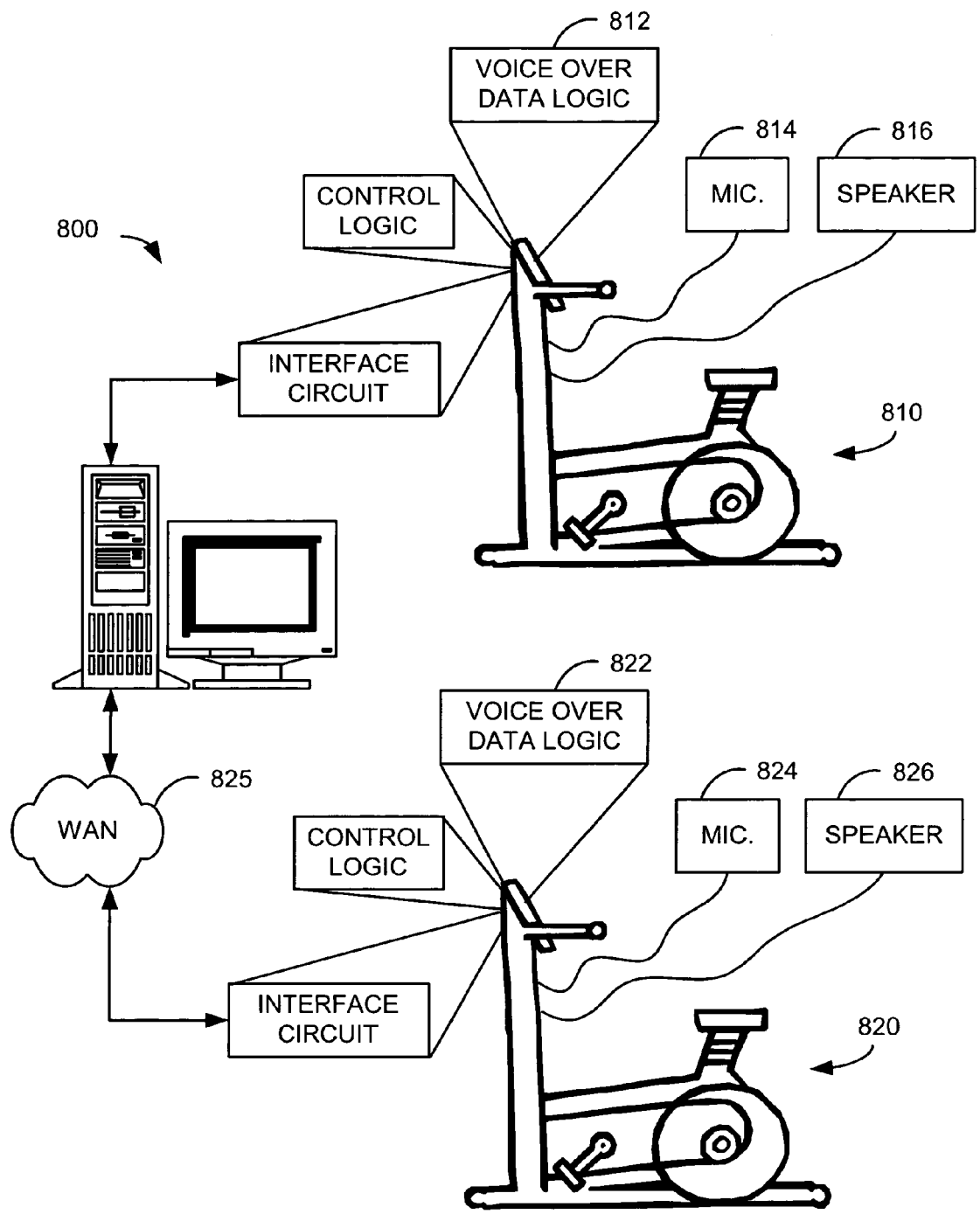
FIG. 15 is a block diagram illustrating certain components of yet another embodiment of the present invention.

Reference is now made to FIG. 15, which illustrates a system 800 in which two geographically-separated exercise bicycles 810 and 820 are coupled for communication across a WAN 825. Basically, the embodiment of FIG. 15 may include any compatible function described in connection with any of the other embodiments presented herein. The exercise bicycles 810 and 820 of FIG. 15 have also illustrated voice-over-data logic 812 and 822. As already discussed herein, voice-over-data logic 812 and 822 may be utilized to allow users on the geographically separated bicycles 810 and 820 to communicate audibly (i.e., talk to each other). Of course, to do this, a microphone 814 and 824 and speaker 816 and 826 are also incorporated into the embodiment. As is known, a microphone converts audible sounds into an electrical signal which may be processed by the voice-over-data logic 812 and 822. As is known, voice-over-data logic allows audible information to be communicated over the WAN 825 "on top of" the data that is exchanged over the WAN 825. Although not specifically shown, additional logic may be incorporated that attenuates the volume of the voice or audible data based upon a simulated separation distance between the two users. In one embodiment, the users may communicate at normal volumes, regardless of their separation distance. Such an embodiment allows the users to essentially carry on conversation while they are exercising, even though they are geographically separated. In another, more real-life embodiment, logic may be provided for attenuating the volume of the audible information based upon the separation distance between the two users. This adds an additional element of realism to the competitive environment, and may be particularly desirable in an embodiment having a virtual-reality display.

Figure 16:
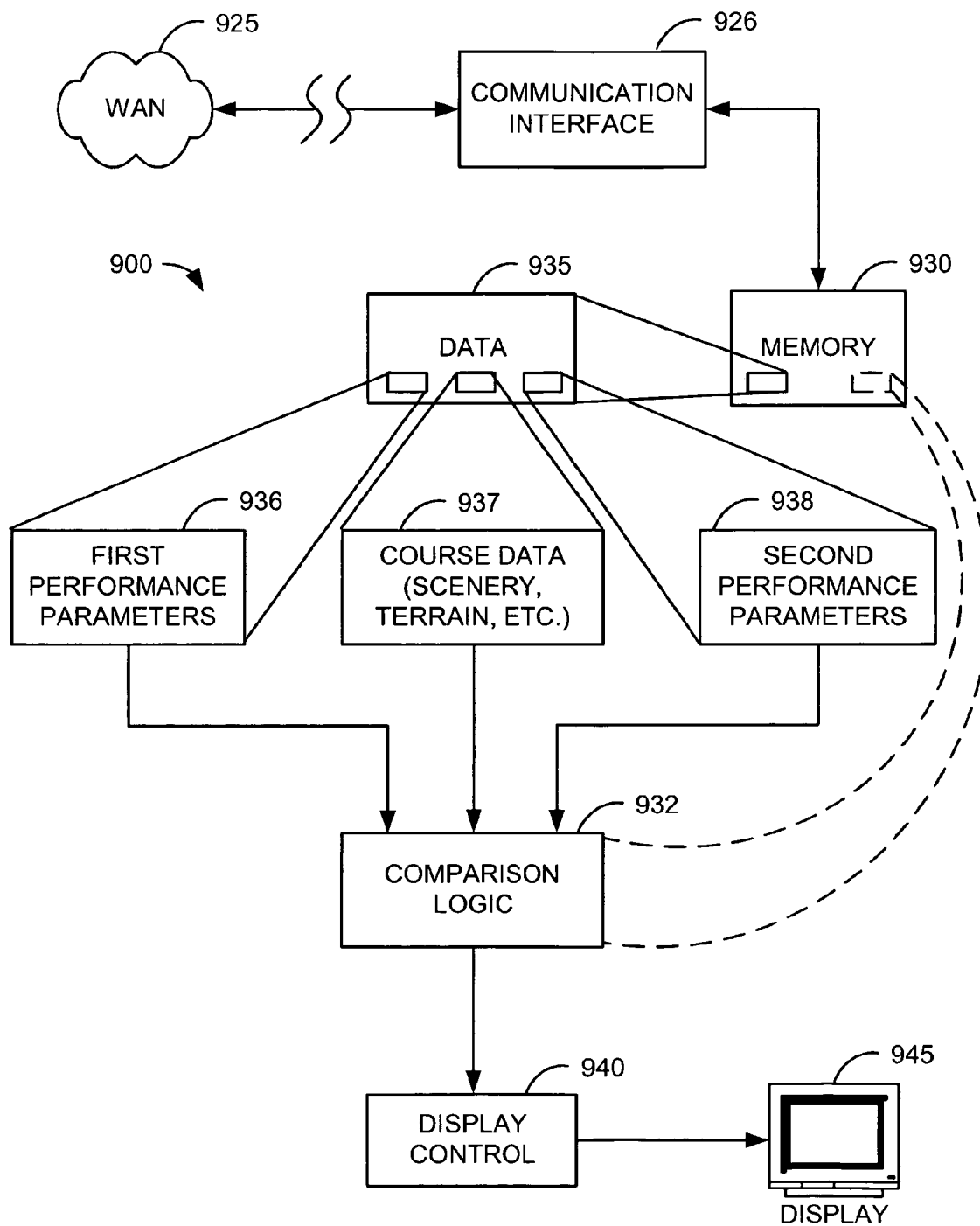
FIG. 16 is a block diagram illustrating certain components of yet another embodiment of the present invention.

Reference is now made to FIG. 16, which illustrates certain components of an embodiment of the invention. As in many of the previously-described embodiments, communication between two or more geographically-separated fitness equipment may take place over a WAN 25 through the use of a communication interface 926. Within the fitness equipment, a memory 930 is provided to store both program code/logic as well as data. As illustrated, a portion of the memory 930 includes data 935. The data may include first performance parameters 936, which may be obtained through the use of sensors or other devices, and which defines the state or activity of certain operating components of the fitness equipment. The data 935 may also include course data 937, which may define the scenery, terrain, or other aspects of the course over which a user is traversing. Of course, the course data 937 may take on different forms, depending upon the embodiment. For example, more graphically-intense embodiments, such as an embodiment that supports a virtual-reality display, may be defined by data that is much different than an embodiment not providing such a graphically intense or detailed scenery.

The data 935 may also include second performance parameters 938, which are communicated to the fitness equipment from a geographically-remote fitness equipment. In essence, the second performance parameters 938 are the equivalent of first performance parameters obtained at a remote fitness equipment and communicated to the current fitness equipment. Likewise, the current fitness equipment may communicate its first performance parameters 936 to any and all remote or geographically-separated fitness equipment that are communicatively-coupled to the current fitness equipment.

The memory 930 may include comparison logic 932, which is configured to effectively perform a comparison between the first performance parameters and the second performance parameters, in relation to the course data. The actual implementation of such comparison logic 932 may take on a wide variety of forms, consistent with the scope and spirit of the present invention. In essence, first performance parameters are compared against course data 937 so that an effective relation between the current user and the course in which he/she is traversing is maintained. Likewise, second performance parameters 938 are similarly compared against the course data and/or the first performance parameters 936 so that the relative position of each user may be tracked and maintained. Further, display control 940 may utilize information from a comparison logic 932 in order to effectively present, on a visual display 945, a comparative relation between the various users. Although illustrated as having only first and second performance parameters, it will be appreciated that the fitness equipment 900 may include data for additional users, if more than two geographically-separated fitness equipment are communicating (i.e., if more than two people are competing in a given event).

Figure 17:
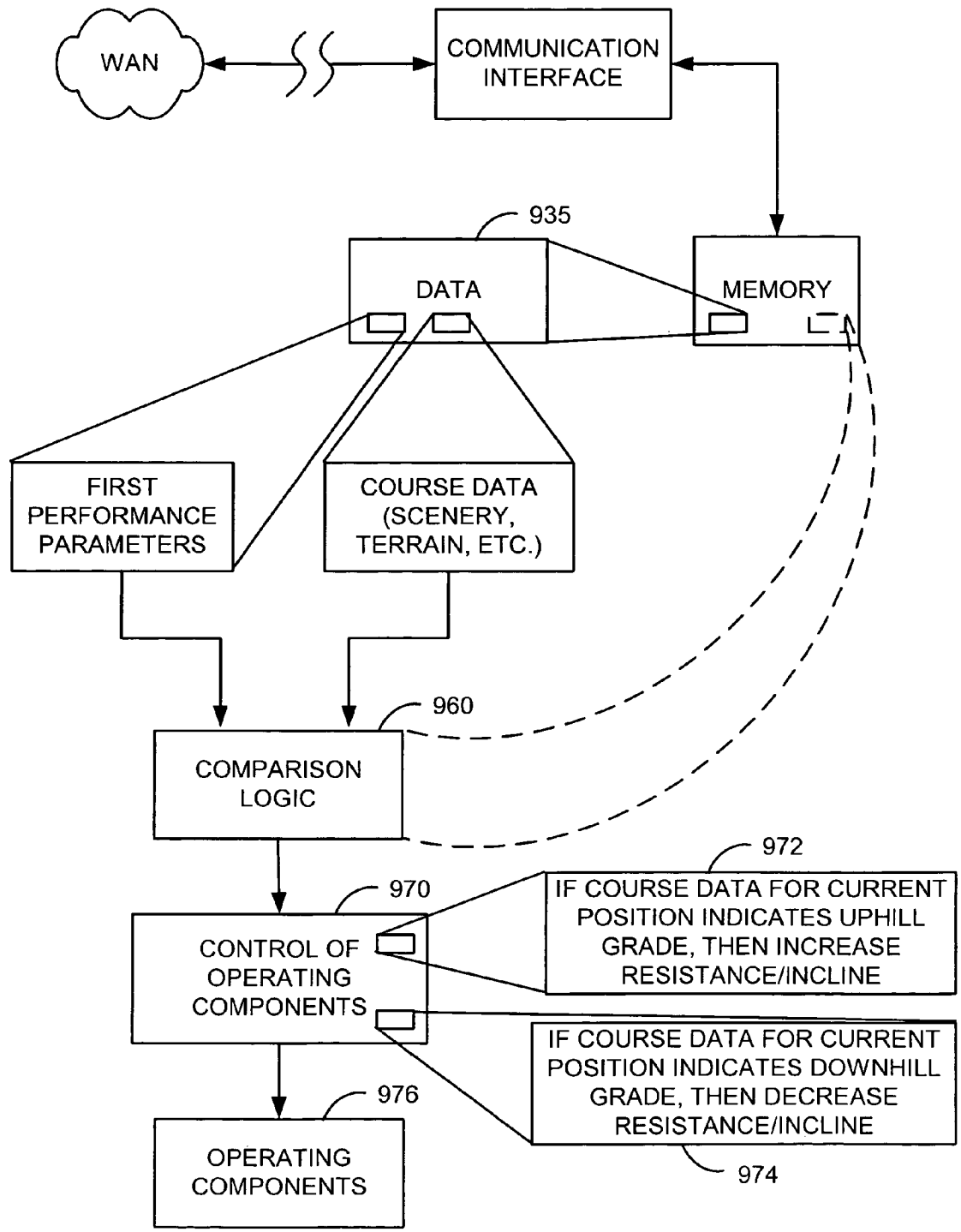
FIG. 17 is a block diagram illustrating certain components of still another embodiment of the present invention.

Reference is now made to FIG. 17, which illustrates certain components similar to the embodiment of FIG. 16. In essence, the additional components illustrated in FIG. 17 may be implemented in an embodiment similar to that of FIG. 16, or alternatively may be implemented in a solo-use embodiment, similar to that illustrated in FIG. 14. Like the embodiment of FIG. 16, at least first performance parameters 936 and course data 937 are provided. Although not specifically illustrated, additional performance parameters for other users may optionally be provided. Comparison logic 960 is provided and configured to perform a comparison between at least the first performance perameter 936 and the course data 937. Logic 970 is also provided to control certain operating components of the fitness equipment. Specifically, if the course data 937, in relation to the first performance parameters 936, indicates that the user is currently going up a hill, then at least one operating component of the fitness equipment is adjusted to increase a level of intensity. For example, if the fitness equipment is a treadmill, then the logic 970 may operate to control a motorized incline of the platform so that the treadmill becomes inclined commensurate with the slope of the hill that the user is traversing. Likewise, if the fitness equipment is an exercise bicycle, then the logic 970 may operate to increase the tension or resistance of the peddling action of the exercise bicycle, at points or locations in which the user is going uphill on the course data 937.

Of course, this adjustment may be commensurate with the slope of the hill. Therefore, FIG. 17 illustrates subcomponents of the logic 970, which include logic 972 for increasing the resistance or incline of the fitness equipment if the course data 937 indicates an uphill grade. Likewise, logic 974 is provided for decreasing the resistance or incline of the fitness equipment when the course data 937 indicates that the user is currently going down a hill or slope. It will be appreciated that the operation of logic 970 is independent of any additional or remote users, since the objective is to increase or decrease the resistance of the current user based upon the position of the current user within the course data 937. FIG. 17 further illustrates operating components 976 (e.g., platform incline, flywheel resistance, etc.), which are controlled by the logic 970.

Figure 18:
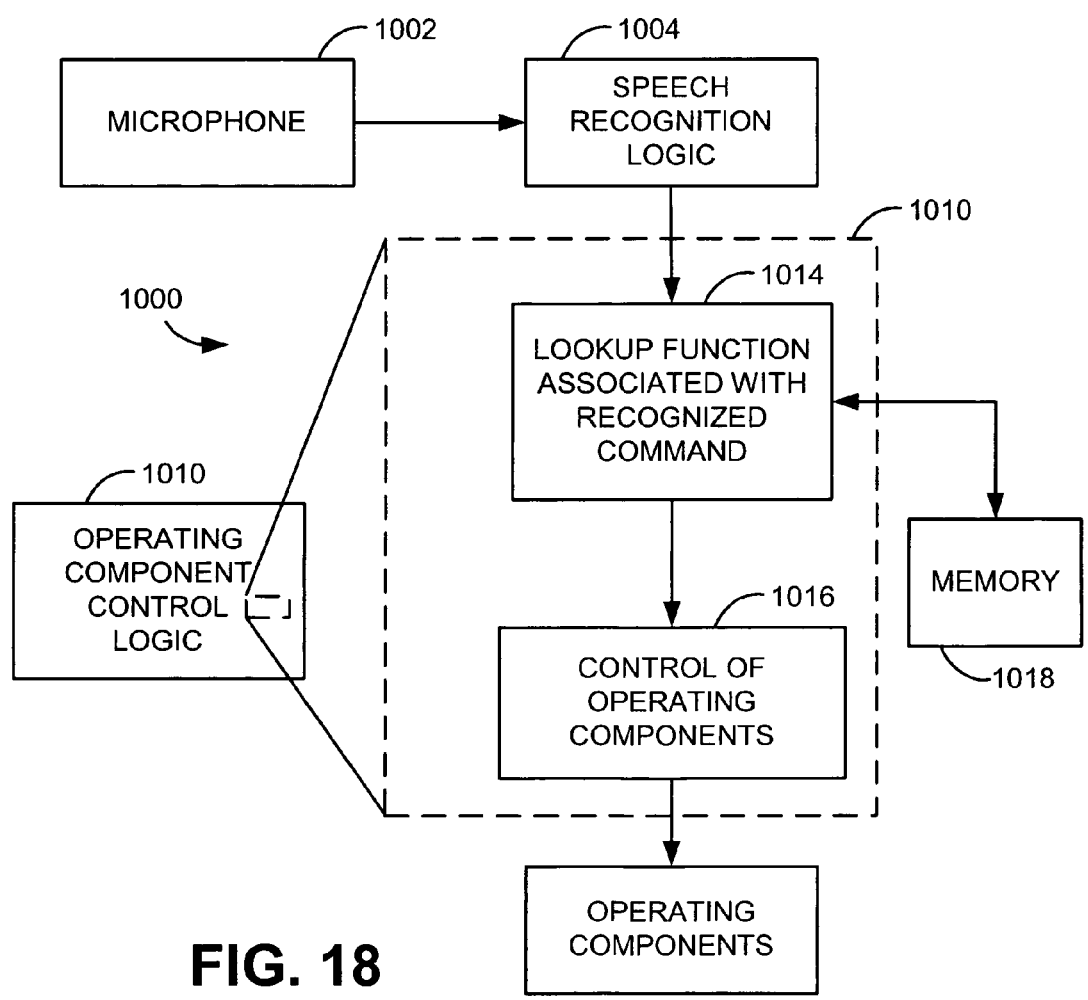
FIG. 18 is a block diagram illustrating certain components of yet another embodiment of the present invention.

Reference is now made to FIG. 18, which shows certain features of an alternative embodiment of the invention. As previously mentioned, certain embodiments of the invention may include speech recognition or speech processing logic, which recognizes certain spoken commands by the user and adjusts the settings or performance of the fitness equipment in response thereto. In this regard, a system 1000 may be provided having a microphone 1002 that generates an output that is directed to speech recognition logic 1004. Operating component control logic 1010 may be provided and configured to respond to an output of the speech recognition logic 1004. In this regard, the operating component control logic 1010 may include logic 1014 for performing a lookup function associated with recognized commands. The operating component control logic may also include logic 1016 for controlling the operating components 1020 in response to the lookup function. Further, a memory 1018 may be provided for storing certain commands that are looked-up in response to the speech recognition logic 1004. By way of illustration, a user may speak certain commands such "increase speed," "increase resistance," "select course number 4," etc. Indeed, a wide variety of functions that may normally be entered by hand on a fitness equipment control panel may be implemented through the use of speech recognition and speech processing functions.

Figure 19:
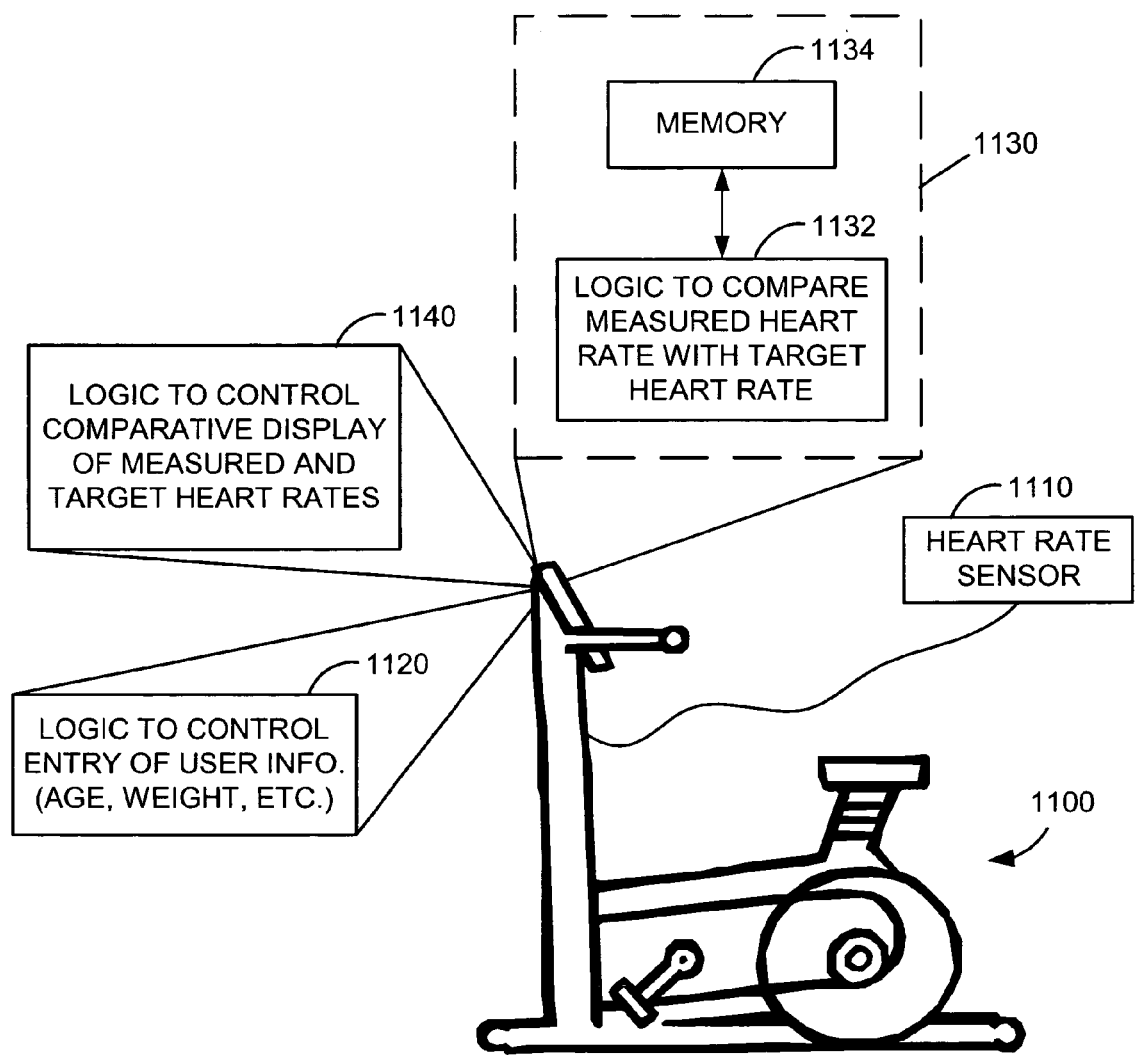
FIG. 19 is a block diagram illustrating certain components of yet another embodiment of the present invention.

Reference is now made to FIG. 19, which illustrates certain features, which may be incorporated in a variety of embodiments of the present invention. FIG. 19 illustrates an exercise bicycle 1100 having a heart-rate sensor 1110, for measuring a user's heart rate. The incorporation or use of heart-rate sensors within fitness equipment is well known, and therefore need not be discussed herein. Suffice to say that the technology used in known fitness equipment for monitoring a user's heart rate may be utilized in embodiments of the present invention. In known fitness equipment, a user's heart rate may be displayed in comparison to a target heart rate that varies depending upon the user's age and exercise goals (i.e., cardiovascular workout, strength workout, fat burning routine, etc.). Information (e.g., age, weight, etc.) pertaining to the user may be input into the fitness equipment. Indeed, logic 1120 which is known may be used to prompt a user to input such information. In essence, a profile for a "competitive" user may be generated based upon the workout objective (e.g., cardiovascular training) based upon the user's age, weight, etc. The heart-rate sensor 1110 may be monitored and compared against the generated profile (e.g., target heart rate). A simulated user or racer may be provided and visually displayed on a display of the fitness equipment, such that the simulated user is simulated as travelling faster than the current user, when the heart rate of the current user is below a target heart rate. Likewise, the current user may be displayed as travelling faster than the simulated user, when the heart rate of the user exceeds the target heart rate. In this way, the heart-rate sensor 1110 may be used to provide a comparative visual display to the user based upon heart rate.

In known fitness equipment, a user's heart rate is displayed against a static graph showing a target heart rate or range for the target heart rate. It should be appreciated that such a display significantly lacks in providing an enhanced competitive environment. When, however, a target heart rate is used to simulate a competitive racer, the competitiveness of the environment is enhanced and therefore a more desirable embodiment is realized.

To provide this functionality, logic 1130 may be provided, which includes logic 1132 to compare a measured heart rate with a target heart rate. In this regard, a memory 1134 may be used to store certain target or measured heart rate information. The embodiment may also include logic 1140 to control a comparative display and measured target heart rates in such a way as to translate the target heart rate into a speed or velocity of a competitive racer. Although there are various ways in which this transformation or translation may be performed, it should be appreciated that the current user's current speed and heart rate may be used in the formula. Furthermore, it will be appreciated that the first few minutes of exercise may be discounted since a user's heart rate takes some time to elevate once an exercise is started. This would prevent, for example, a user from immediately getting behind in the start of a race. Of course, additional implementation details and embodiments may be provided consistent with the scope and spirit of the present invention.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for interactive fitness comprising:
   a server;
   a plurality of geographically-separated fitness equipment configured for communication with the server via a wide-area network, each of the fitness equipment comprising:
      at least one operating component;
      logic configured to obtain first performance parameters from the at least one operating component;
      logic configured to communicate the first performance parameters to a remote fitness equipment via the wide-area network and the server;
      logic configured to receive second performance parameters communicated from at least one remote fitness equipment;
      a communication interface through which data may be communicated to and from the fitness equipment;
      a display associated with the fitness equipment; and
      logic configured to drive the display in response to both the first and second performance parameters, such that a performance comparison between the fitness equipment and at least one remote fitness equipment is visually displayed; and
   a computer program executed by the server to configure the server for coordinating the communication among the plurality of fitness equipment, such that a plurality of the geographically-separated fitness equipment may simulate interactive exercise events.

2. The system as defined in claim 1, wherein the fitness equipment is one selected from the group consisting of a treadmill, a skiing machine, an exercise bike, a rowing machine, a stepping machine, and a orbital stepping machine.

3. The system as defined in claim 1, wherein the display is one selected from the group consisting of a virtual-reality display, an augmented-reality display, a cathode-ray tube, a liquid-crystal display, a light-emitting diode display, and a gas-plasma display.

4. The system as defined in claim 1, wherein the at least one operating component is one selected from the group consisting of a motor, a flywheel, a conveyor, a wheel, and a magnetic arrangement.

5. The system as defined in claim 1, where each fitness equipment further includes logic to download data defining course data for a selected course through the communication interface.

6. An interactive fitness equipment comprising:
   at least one operating component configured to provide an aspect of exercise for a user of the fitness equipment;
   logic configured to obtain first performance parameters from the at least one operating element;
   logic configured to communicate the first performance parameters to a remote fitness equipment;
   logic configured to receive second performance parameters communicated from the remote fitness equipment;
   a display associated with the fitness equipment; and
   logic configured to control the display in response to both the first and second performance parameters, such that a performance comparison between the fitness equipment and at least one remote fitness equipment is visually displayed.

7. The interactive fitness equipment as defined in claim 6, further comprising logic provided at the server to provide a plurality of courses for the plurality of fitness equipment.

8. The interactive fitness equipment as defined in claim 7, wherein each of the fitness equipment include logic to download data defining a selected course.

9. The interactive fitness equipment as defined in claim 7, wherein each of the fitness equipment include logic to compare the first performance parameters with course data, such that a user's relative position on a course is determined and maintained.

10. The interactive fitness equipment as defined in claim 9, wherein each of the fitness equipment further includes logic to control an operational aspect of the at least one operating component in response to the user's relative position on the course.

11. The interactive fitness equipment as defined in claim 10, wherein the logic to control an operation aspect is configured to vary an intensity of the operational aspect in proportion to an elevation grade defined by the course data corresponding to the user's relative position.

12. The interactive fitness equipment as defined in claim 6, further including a communication interface.

13. The interactive fitness equipment as defined in claim 12, wherein the communication interface includes logic configured to control communication with the remote fitness equipment over a communication link, wherein the communication link includes one selected from the group consisting of: a wireless link, a direct electrical connection, a local-area network, and a wide-area network.

14. The interactive fitness equipment as defined in claim 12, wherein the communication interface is configured to communicate directly with the remote fitness equipment.

15. The interactive fitness equipment as defined in claim 12, wherein the communication interface is configured to communicate with the remote fitness equipment through at least one intermediate computer.

16. The interactive fitness equipment as defined in claim 6, further including a microphone and logic for communicating an audible input to the microphone to a remote fitness equipment in the form of audio data.

17. The interactive fitness equipment as defined in claim 6, further including a speaker and logic for audibly outputting audio data received from a remote fitness equipment.

18. An interactive fitness equipment comprising:
   at least one operating component configured to provide an aspect of exercise for a user of the fitness equipment;
   logic configured to obtain first performance parameters from the at least one operating component;
   a memory for storing course data;
   a display; and
   at least one element selected from the group consisting of:
      (1) logic configured to control an aspect of the at least one operating component based on both the first performance parameters and information from stored course data;
      (2) logic configured to control the display in response to both the first performance parameters and information from stored course data;

(3) logic configured to permit a user to select at least one competitive racer, the at least one competitive racer being defined by data stored in a memory;

(4) a communications interface and logic for controlling the download of course data through a communication interface;

(5) speech processing logic configured to recognize certain spoken commands and adjust operating parameters of the fitness equipment in response thereto;

(6) a communications interface and logic for controlling the download and installation of a software upgrade through a communication interface; and (7) a heart-rate sensor and logic configured to control the display to display a current position of a user in a course defined by the course data, the current position of the user being based upon the first performance parameters, further including logic configured to control the display to display a simulated competitive racer, wherein the position and speed of the competitive racer are based upon a combination of the first performance parameters, an output from the heart-rate sensor, and a target heart rate the user, whereby when the output from the heart-rate sensor exceeds the target heart rate, the speed of the simulated competitive racer is less than the speed measured from the first performance parameters and when the target heart rate exceeds the output from the heart-rate sensor, the speed of the simulated competitive racer is greater than the speed measured from the first performance parameters.

19. The interactive fitness equipment as defined in claim 18, having at least three elements selected from the group consisting of:

(1) logic configured to control an aspect of the at least one operating component based on both the first performance parameters and information from stored course data;

(2) logic configured to control the display in response to both the first performance parameters and information from stored course data;

(3) logic configured to permit a user to select at least one competitive racer, the at least one competitive racer being defined by data stored in a memory;

(4) a communications interface and logic for controlling the download of course data through a communication interface;

(5) speech processing logic configured to recognize certain spoken commands and adjust operating parameters of the fitness equipment in response thereto;

(6) a communications interface and logic for controlling the download and installation of a software upgrade through a communication interface; and (7) a heart-rate sensor and logic configured to control the display to display a current position of a user in a course defined by the course data, the current position of the user being based upon the first performance parameters, further including logic configured to control the display to display a simulated competitive racer, wherein the position and speed of the competitive racer are based upon a combination of the first performance parameters, an output from the heart-rate sensor, and a target heart rate the user, whereby when the output from the heart-rate sensor exceeds the target heart rate, the speed of the simulated competitive racer is less than the speed measured from the first performance parameters and when the target heart rate exceeds the output from the heart-rate sensor, the speed of the simulated competitive racer is greater than the speed measured from the first performance parameters.

20. The system of claim 1, wherein each of the fitness equipment further comprises:

logic configured to control an aspect of the at least one operating component based on both the first performance parameters and information from stored course data;

logic configured to control the display in response to both the first performance parameters and information from stored course data;

logic configured to permit a user to select at least one competitive racer, the at least one competitive racer being defined by data stored in a memory;

a communications interface and logic for controlling the download of course data through a communication interface;

speech processing logic configured to recognize certain spoken commands and adjust operating parameters of the fitness equipment in response thereto;

a communications interface and logic for controlling the download and installation of a software upgrade through a communication interface; and a heart-rate sensor and logic configured to control the display to display a current position of a user in a course defined by the course data, the current position of the user being based upon the first performance parameters, further including logic configured to control the display to display a simulated competitive racer, wherein the position and speed of the competitive racer are based upon a combination of the first performance parameters, an output from the heart-rate sensor, and a target heart rate the user, whereby when the output from the heart-rate sensor exceeds the target heart rate, the speed of the simulated competitive racer is less than the speed measured from the first performance parameters and when the target heart rate exceeds the output from the heart-rate sensor, the speed of the simulated competitive racer is greater than the speed measured from the first performance parameters.

* * * * *

UNITED STATES PATENT AND TRADEMARK OFFICE
CERTIFICATE OF CORRECTION

PATENT NO. : 6,902,513 B1
DATED : June 7, 2005
INVENTOR(S) : Daniel R. McClure

It is certified that error appears in the above-identified patent and that said Letters Patent is hereby corrected as shown below:

Column 23,
Line 63, change "operating element" to -- operating component --.

Signed and Sealed this

Thirtieth Day of August, 2005

JON W. DUDAS
*Director of the United States Patent and Trademark Office*